United States Patent
Ren et al.

(10) Patent No.: US 10,191,634 B2
(45) Date of Patent: Jan. 29, 2019

(54) METHODS AND DEVICES FOR DISPLAYING DOCUMENT ON TOUCH SCREEN DISPLAY

(71) Applicant: Xiaomi Inc., Beijing (CN)

(72) Inventors: Tian Ren, Beijing (CN); Yin Zhu, Beijing (CN); Yueyue Chu, Beijing (CN); Tao Lin, Beijing (CN)

(73) Assignee: Xiaomi Inc., Beijing (CN)

( * ) Notice: Subject to any disclaimer, the term of this patent is extended or adjusted under 35 U.S.C. 154(b) by 426 days.

(21) Appl. No.: 14/980,986

(22) Filed: Dec. 28, 2015

(65) Prior Publication Data

US 2016/0224223 A1     Aug. 4, 2016

(30) Foreign Application Priority Data

Jan. 30, 2015 (CN) .......................... 2015 1 0050331

(51) Int. Cl.
*G06F 3/048* (2013.01)
*G06F 3/0484* (2013.01)
(Continued)

(52) U.S. Cl.
CPC ........ *G06F 3/04845* (2013.01); *G06F 3/0482* (2013.01); *G06F 3/0485* (2013.01); *G06F 3/0488* (2013.01); *G06F 3/04883* (2013.01)

(58) Field of Classification Search
CPC ... G06F 3/04845; G06F 3/0482; G06F 3/0485
See application file for complete search history.

(56) References Cited

U.S. PATENT DOCUMENTS

2008/0063456 A1\* 3/2008 Lahr ................... G06F 1/1615
                                                                                    400/491
2008/0168384 A1\* 7/2008 Platzer ............... G06F 3/04845
                                                                                    715/784
(Continued)

FOREIGN PATENT DOCUMENTS

CN         102486713 A        6/2012
CN         102566888 A        7/2012
(Continued)

OTHER PUBLICATIONS

Extended European search report issued in corresponding European Application No. 16150314.9, dated May 31, 2016, 9 pages.
(Continued)

*Primary Examiner* — Phuong H Nguyen
(74) *Attorney, Agent, or Firm* — Arch & Lake LLP

(57) ABSTRACT

The present disclosure relates to methods and devices for displaying a document on a touch screen display, which belongs to the field of human computer interaction. The method for displaying a document on a touch screen display includes: displaying an edge region of an electronic document on the touch screen display where the edge region contains an edge of the electronic document and one or more display elements, detecting a movement of an object acting on the touch screen display, and in response to the movement of the object, stretching, for display, the one or more display elements in a direction away from the edge. Thereby, it reminds the user that the display has reached the edge of the electronic document, prevents the user from repeating move operation which is practically inapplicable, and thus improves efficiency of user operation.

17 Claims, 21 Drawing Sheets

(51) Int. Cl.
   *G06F 3/0482*  (2013.01)
   *G06F 3/0485*  (2013.01)
   *G06F 3/0488*  (2013.01)

(56) References Cited

U.S. PATENT DOCUMENTS

| | | | |
|---|---|---|---|
| 2010/0251167 A1* | 9/2010 | DeLuca | G06F 3/0485 715/786 |
| 2011/0010659 A1* | 1/2011 | Kim | G06F 3/0485 715/784 |
| 2011/0078622 A1* | 3/2011 | Missig | G06F 3/0486 715/784 |
| 2011/0090255 A1* | 4/2011 | Wilson | G06F 3/04817 345/647 |
| 2011/0093812 A1* | 4/2011 | Fong | G06F 3/0485 715/810 |
| 2011/0107264 A1* | 5/2011 | Akella | G06F 3/0485 715/830 |
| 2011/0202834 A1* | 8/2011 | Mandryk | G06F 3/04883 715/701 |
| 2011/0202859 A1* | 8/2011 | Fong | G06F 3/04883 715/769 |
| 2011/0225545 A1 | 9/2011 | Horodezky et al. | |
| 2012/0017177 A1* | 1/2012 | Kim | G06F 3/0486 715/828 |
| 2012/0023509 A1* | 1/2012 | Blumenberg | G06F 3/04845 719/329 |
| 2012/0272181 A1* | 10/2012 | Rogers | G06F 3/0482 715/784 |
| 2012/0278754 A1* | 11/2012 | Lehmann | G09G 5/34 715/784 |
| 2012/0278755 A1* | 11/2012 | Lehmann | G09G 5/34 715/784 |
| 2013/0002707 A1* | 1/2013 | Jakab | G09G 5/34 345/619 |
| 2014/0002502 A1* | 1/2014 | Han | G06T 11/60 345/646 |
| 2014/0169765 A1* | 6/2014 | Wang | H04N 9/79 386/280 |
| 2014/0215310 A1* | 7/2014 | Kim | G06F 3/04883 715/234 |
| 2014/0232754 A1 | 8/2014 | Wang | |
| 2014/0325445 A1 | 10/2014 | Akella | |
| 2015/0052474 A1 | 2/2015 | Kim et al. | |
| 2015/0324376 A1* | 11/2015 | Jeon | G06F 3/04842 715/234 |

FOREIGN PATENT DOCUMENTS

| | | |
|---|---|---|
| CN | 102597944 A | 7/2012 |
| CN | 102855078 A | 1/2013 |
| CN | 104850340 A | 8/2015 |
| JP | 2012083878 A | 4/2012 |
| JP | 2013508812 A | 3/2013 |
| KR | 20110006021 A | 1/2011 |
| KR | 101728460 B1 | 4/2017 |
| RU | 2439653 C2 | 1/2012 |
| WO | 2014013752 A1 | 1/2014 |

OTHER PUBLICATIONS

International Search Report (including English translation) issued in corresponding International Application No. PCT/CN2015/088703, dated Dec. 16, 2015, 4 pages.
Notification of Reasons for Refusal (including English translation) issued in corresponding Japanese Patent Application No. 2016-571461, dated Mar. 28, 2017, 10 pages.
Notification of Reason for Refusal (including English translation) issued in corresponding Korean Patent Application No. 10-2015-7030813, dated Aug. 17, 2016, 15 pages.
First Substantive Requirement IPL PCT (including English translation) issued in corresponding Mexican Patent Application No. MX/a/2015/016617, dated Jun. 21, 2017, 4 pages.
Notification of the results of examination of patentability (including English translation) issued in corresponding Russian Patent Application No. 2016102344/08(003357), dated Mar. 14, 2017, 14 pages.
Search Report issued in corresponding application PCT/CN2015/088703, dated Dec. 16, 2015, pp. 1-5.

* cited by examiner

METHODS AND DEVICES FOR DISPLAYING DOCUMENT ON TOUCH SCREEN DISPLAY

The present application claims priority to Chinese Patent Application No. 201510050331.0, filed Jan. 30, 2015, the entire contents of which are incorporated herein by reference.

FIELD

The present disclosure generally relates to the field of human computer interaction, and more particularly, to methods and devices for displaying a document on a touch screen display.

BACKGROUND

With functionality of mobile terminals becomes increasingly powerful, contents to be displayed on a user interface of a mobile terminal become increasingly numerous. In this case, easiness to use of the user interface becomes especially important. In particular, when a mobile terminal has a relatively small screen size, easiness to use of the user interface is even more important.

In case where the mobile terminal has a relatively small screen size and an electronic document has a relatively large screen size, only a part of the electronic document can be displayed on the screen at a time. Then, a user needs to move the electronic document on the screen for display, so as to display other parts of the electronic document. For example, the user can move the electronic document upward or downward for display.

However, when the mobile terminal is displaying one side of the electronic document, a request triggered by the user for moving the electronic documents to another side for display, is typically not responded by the mobile terminal. At this time, it is often appreciated by the user as if the mobile terminal might be stuck or crashed.

SUMMARY

According to a first aspect of embodiments of the present disclosure, there is provided a method for displaying a document on a touch screen display, including: displaying an edge region of an electronic document on the touch screen display, the edge region containing an edge of the electronic document and one or more display elements, each corresponding to a sub-region of an electronic document detecting a movement of an object acting on the touch screen display, and in response to the movement of the object, stretching, for display, the one or more display elements in a direction away from the edge, the one or more display elements not being stretched in a direction perpendicular to the direction away from the edge.

According to a second aspect of embodiments of the present disclosure, there is provided a method for displaying a document on a touch screen display, including: displaying a first region of an electronic document on the touch screen display, detecting a movement of an object acting on the touch screen display, in response to the movement of the object, moving for display the first region of the electronic document as a second region, when it is detected that the object is no longer on the touch screen display, keeping moving for display the second region of the electronic document, if the moving for display reaches an edge region of the electronic document, stretching, for display, one or more display elements in the edge region in a direction away from an edge of the electronic document, the one or more display elements not being stretched in a direction perpendicular the direction away from the edge, and the edge region containing the edge and the one or more display elements, and recovering the display elements that have been stretched for display to display states before the stretch.

According to a third aspect of embodiments of the present disclosure, there is provided a device for displaying a document on a touch screen display, including: a processor, memory for storing instructions executable by the processor; and a touch screen display electrically connected to the processor. The processor is configured to perform displaying an edge region of an electronic document on the touch screen display, the edge region containing an edge of the electronic document and one or more display elements, detecting a movement of an object acting on the touch screen display, and in response to the movement of the object, stretching, for display, the one or more display elements in a direction away from the edge, the one or more display elements not being stretched in a direction perpendicular to the direction away from the edge.

According to a fourth aspect of embodiments of the present disclosure, there is provided a device for displaying a document on a touch screen display, including a processor, a memory for storing instructions executable by the processor, and a touch screen display electrically connected to the processor. The processor is configured to perform displaying a first region of an electronic document on the touch screen display, detecting a movement of an object acting on the touch screen display, in response to the movement of the object, moving for display the first region of the electronic document as a second region, when it is detected that the object is no longer on the touch screen display, keeping moving for display the second region of the electronic document, if the moving for display reaches an edge region of the electronic document, stretching, for display, one or more display elements in the edge region in a direction away from an edge of the electronic document, the one or more display elements not being stretched in a direction perpendicular the direction away from the edge, and the edge region containing the edge and the one or more display elements, and recovering the display elements that have been stretched for display to display states before the stretch.

It is to be understood that both the foregoing general description and the following detailed description are exemplary and explanatory only and are not restrictive of the invention, as claimed.

DRAWINGS

The accompanying drawings, which are incorporated in and constitute a part of this specification, illustrate embodiments consistent with the invention and, together with the description, serve to explain the principles of the invention.

Through the above accompany drawings, the specific embodiments of the disclosure have been shown, for which a more detailed description will be given as below. These drawings and textual description are not intended to limit the scope of the concept of the disclosure in any manner, but to explain the concept of the disclosure to those skilled in the art through particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

First of all, some terms involved in the embodiments of the present disclosure are explained as follows.

An electronic document refers to a subset or a superset of a web page, a digital image, an electronic file, an electronic table, an application interaction interface and an operating system interaction interface. Typically, an electronic document requires a display region larger than a display region of a single screen of a touch screen display.

A display element refers to a subset or a superset of an icon, a head portrait, an image, a text, a cell and an interactive widget. Typically, a display element occupies a sub-region of an electronic document. Various display elements can be adjacent to each other, or be separated.

An edge region refers to a part of a region of an electronic document. A size of an edge region is equal to or smaller than a display region of a single screen of a touch screen display. An edge region contains an edge of an electronic document and one or more display elements.

Figure 1:
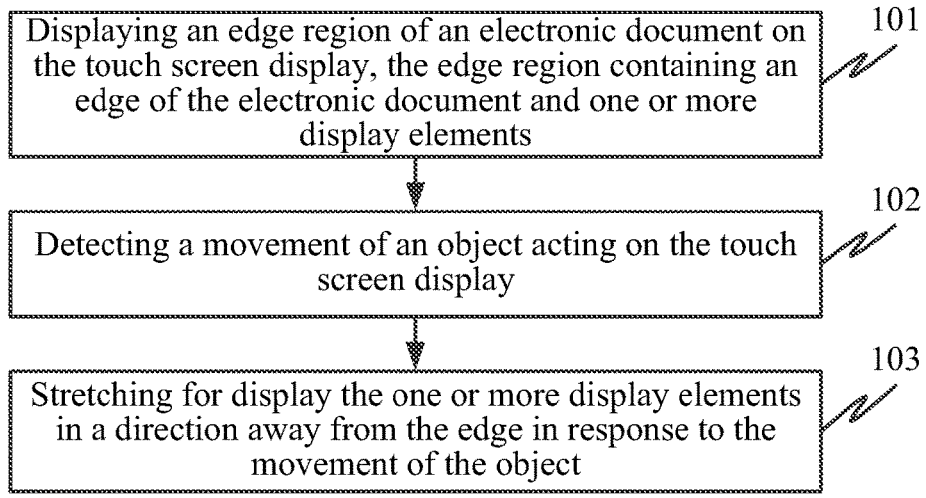
FIG. 1 is a flow chart of a method for displaying a document on a touch screen display according to an exemplary embodiment.

FIG. 1 is a flow chart of a method for displaying a document on a touch screen display according to an exemplary embodiment. In the present embodiment, the method for displaying a document is described as applied in a terminal having a touch screen display, for example. The method for displaying a document can include the following steps.

In step 101, an edge region of an electronic document is displayed on the touch screen display. The edge region contains an edge of the electronic document and one or more display elements.

In step 102, a movement of an object acting on the touch screen display is detected.

In step 103, the one or more display elements are stretched for display in a direction away from the edge, in response to the movement of the object.

Accordingly, in the method for displaying a document provided by the present embodiment, when display reaches an edge region of an electronic document, one or more display elements are stretched for display in a direction away from the edge of the electronic document, as a response to a move operation of the user. Thereby, it reminds the user that the display has reached the edge of the electronic document, prevents the user from repeating move operation which is practically inapplicable, and thus improves efficiency of user operation.

Figure 2A:
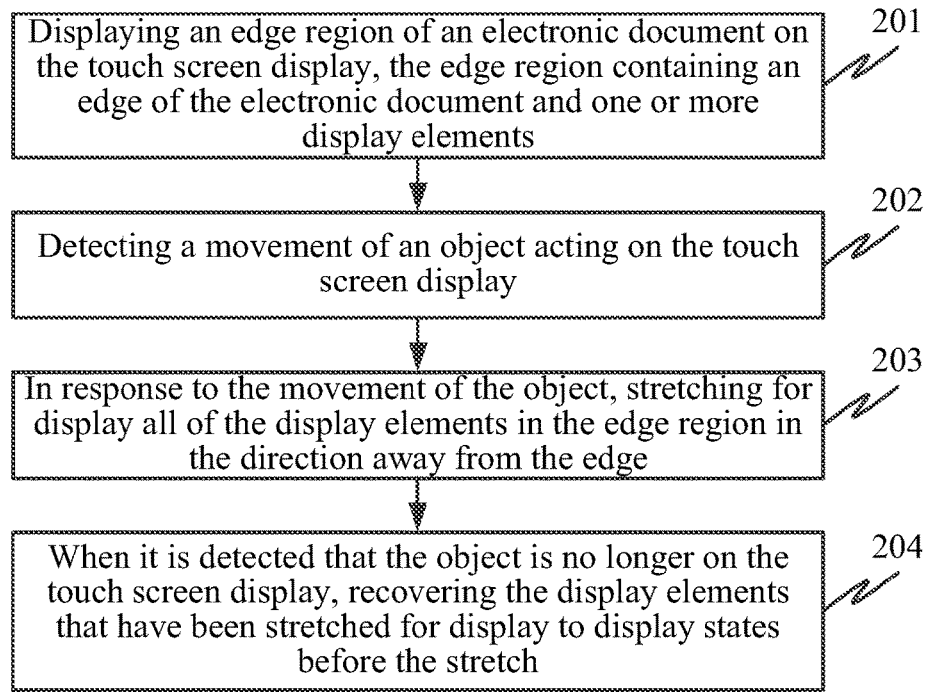
FIG. 2A is a flow chart of a method for displaying a document on a touch screen display according to another exemplary embodiment.

FIG. 2A is a flow chart of a method for displaying a document on a touch screen display according to another exemplary embodiment. In the present embodiment, the method for displaying a document is described as applied in a terminal having a touch screen display, for example. The method for displaying a document can include the following steps.

In step 201, an edge region of an electronic document is displayed on the touch screen display. The edge region contains an edge of the electronic document and one or more display elements.

The edge of the electronic document can overlap with the edge of display region of the touch screen display, and is not clearly indicated as an edge in the display region of the touch screen display.

In step 202, a movement of an object acting on the touch screen display is detected.

The object refers to a control object such as a finger of a user, a touch pen or other objects which can be detected by the touch screen display.

If the touch screen display does not support hovering touch, the object is required to directly act on the touch screen display.

If the touch screen display supports hovering touch, the object can directly act on the touch screen display, or the object can hover with a space interval to act on the touch screen display.

When the object moves, the terminal detects the movement of the object through the touch screen display. For example, the movement can be a movement away from an edge in an edge region.

In step 203, all of the display elements in the edge region are stretched for display in the direction away from the edge, in response to the movement of the object.

As a response to the movement of the object, the terminal stretches for display all of the display elements in the edge region in the direction away from the edge. Stretching for display refers to a display manner of enlarging a display element in a direction away from the edge. The edge refers to the edge away from which the object moves.

A stretch ratio for each of the display elements may be the same. Alternatively, the stretch ratio for each of the display elements positively correlates to a first distance which is a distance between the display element and the edge.

Figure 2B:
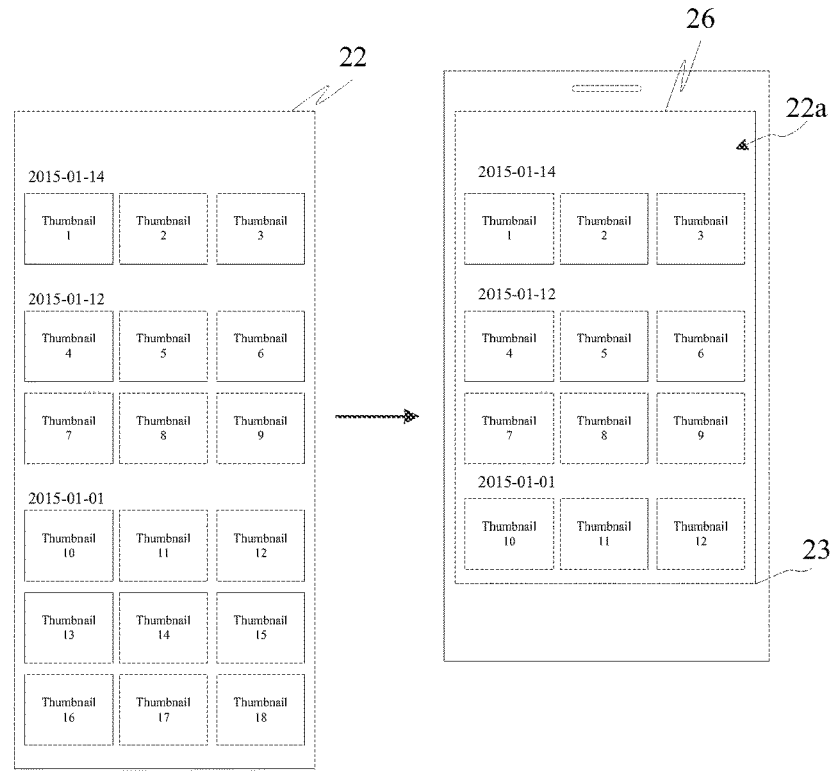
FIGS. 2B to 2E are schematic interfaces of the exemplary embodiment shown in FIG. 2A in implementation.

As an example, referring to FIG. 2B, an electronic document is an interaction interface 22 of a picture application. The interaction interface 22 contains 18 thumbnails arranged successively in six rows and three columns. The 18 thumbnails are respectively numbered as 1-18. However, since the touch screen display 23 has a relatively small display region, only an edge region 22a of the interaction interface 22 can be displayed. The edge region 22a contains an upper edge 26 of the interaction interface 22 and thumbnails numbered 1-12 arranged successively in four rows and three columns. Wherein, the upper edge 26 of the interaction interface 22 overlaps with the upper edge of the touch screen display 23, and is not clearly indicated as an edge in FIG. 2B.

Figure 2C:
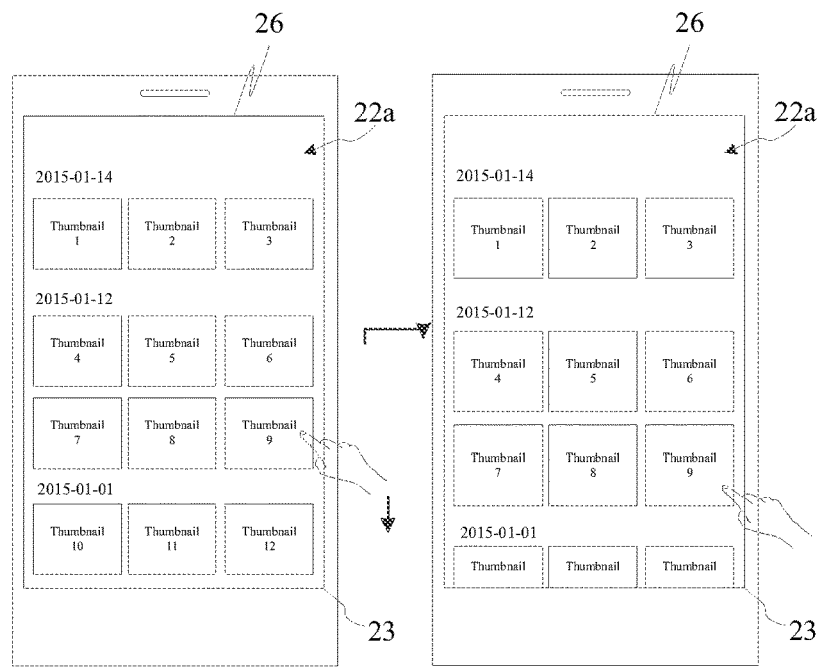
Figure 2D:
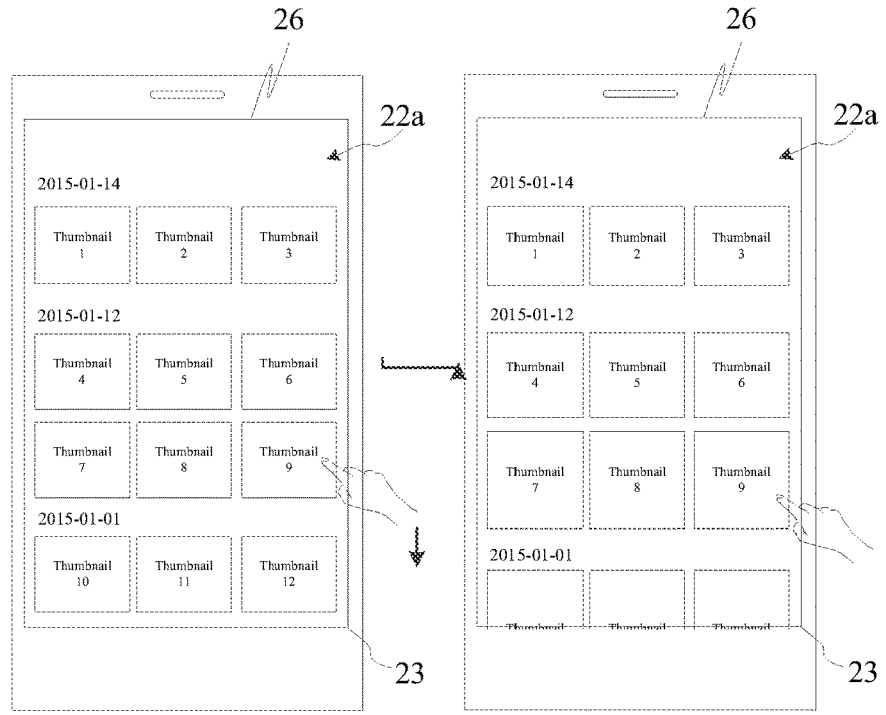

Referring to FIGS. 2C and 2D, when an object (for example a finger of a user) moves downward on the touch screen display 23, the terminal detects the movement of the finger through the touch screen display 23. In response to the movement of the finger, the terminal stretches for display the 12 thumbnails in the edge region 22a in a direction away from the upper edge 26. Widths of the thumbnails remain unchanged after the stretch, while heights thereof are increased. Moreover, a part of the thumbnails 10, 11 and 12 in the last row are moved out of the display region of the touch screen display 23 and are no longer displayed. An interval between every two rows of stretched thumbnails can be generally kept unchanged, or an interval between every two rows of stretched thumbnails can also be stretched for display.

Wherein, as shown in the example of FIG. 2C, the stretch ratio for each of the thumbnails is the same. That is, each of the thumbnails has the same height after the stretch. The stretch ratio positively correlates to a moving distance of the finger. That is, the longer the moving distance of the finger on the touch screen display 23 is, the larger the stretch ratio is; and the shorter the moving distance of the finger on the touch screen display 23 is, the smaller the stretch ratio is.

In the example of FIG. 2D, the stretch ratio for each of the thumbnails is different from each other, and the stretch ratio for each of the thumbnails positively correlates to a first distance, and the first distance is a distance between a thumbnail and the upper edge 26. That is, the larger a distance between a stretched thumbnail and the upper edge 26 is, the larger a stretch ratio for the thumbnail is; and the smaller a distance between a stretched thumbnail and the upper edge 26 is, the smaller a stretch ratio for the thumbnail is. For example, the thumbnails 7, 8 and 9 are stretched with a first stretch ratio, the thumbnails 4, 5 and 6 are stretched with a second stretch ratio, and the first stretch ratio is larger than the second stretch ratio.

In step 204, when it is detected that the object is no longer on the touch screen display, the display elements that have been stretched for display are recovered to display states before the stretch.

When it is detected that the object is no longer on the touch screen display, the terminal recovers the display elements that have been stretched for display to display states before the stretch. The recovering process can be regarded as an inverse process of step 203. However, unlike step 203 in which the stretch follows the movement of the object, in step 204, the recovering process is performed at a preset rate or in a preset time.

In other words, the terminal can recover the display elements that have been stretched for display to display states before the stretch at a preset rate. The preset rate can be a uniform rate, a uniform deceleration rate, a uniform acceleration rate, a rate positively correlating to the stretch rate, or the like. The present embodiment does not limit the preset rate.

Alternatively, the terminal can recover the display elements that have been stretched for display to display states before the stretch in a preset time. The preset time can be 0.2 second.

Figure 2E:
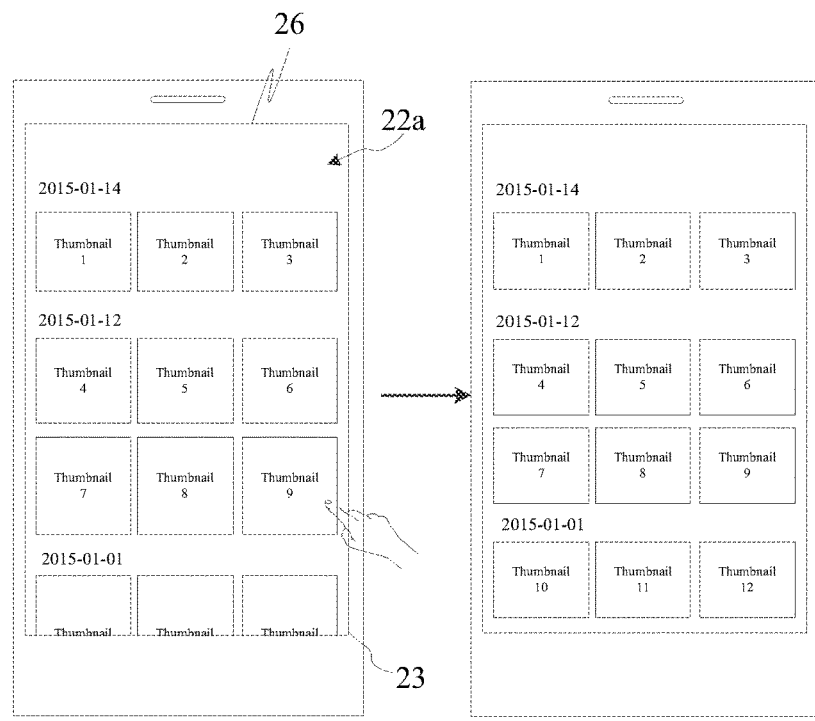

As an example, as shown in FIG. 2E, when it is detected that the finger is no longer on the touch screen display 23, the terminal recovers the 12 thumbnails that have been stretched for display to display states before the stretch in 0.2 second.

It should be noted that, in both of the stretch for display process and the recovering for display process as described above, the terminal maintains the display state of the edge of the electronic document unchanged.

As another possibility of step 204, if it is detected that the object is still on the touch screen display and the object remains still and no longer moves, the terminal maintains the current display state unchanged.

Accordingly, in the method for displaying a document provided by the present embodiment, when display reaches an edge region of an electronic document, one or more display elements are stretched for display in a direction away from the edge of the electronic document, as a response to a move operation of the user. Thereby, it reminds the user that the display has reached the edge of the electronic document, prevents the user from repeating move operation which is practically inapplicable, and thus improves efficiency of user operation.

Further, in the method for displaying a document provided by the present embodiment, the display elements that have been stretched for display are recovered to display states before the stretch. Thereby, after the user is reminded that the display has reached the edge of the electronic document, the display state can be recovered to the state before the stretch, to facilitate other operations of the user.

Figure 3A:
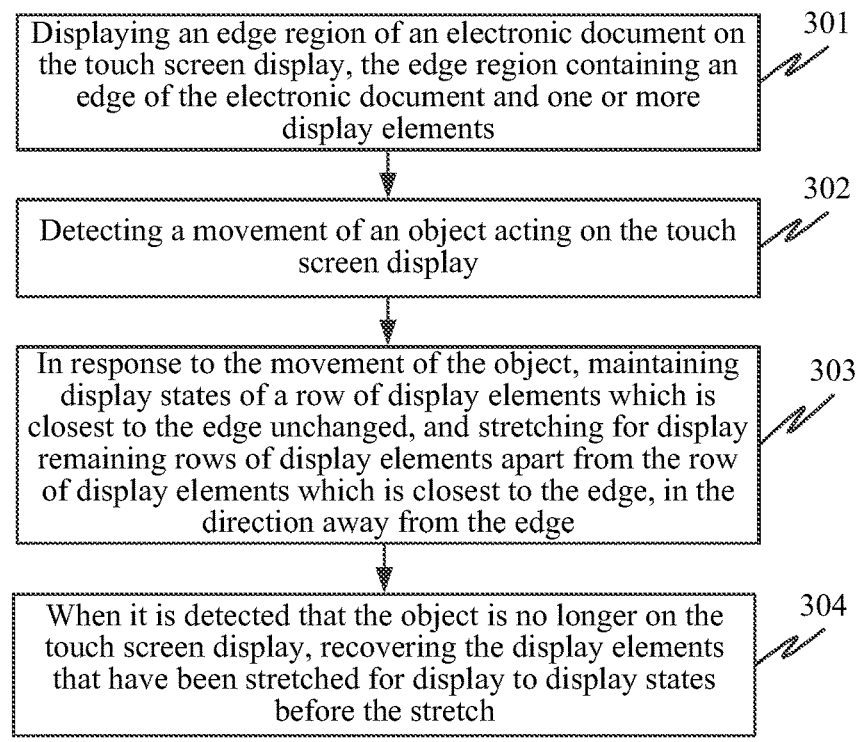
FIG. 3A is a flow chart of a method for displaying a document on a touch screen display according to another exemplary embodiment.

FIG. 3A is a flow chart of a method for displaying a document on a touch screen display according to another exemplary embodiment. In the present embodiment, the method for displaying a document is described as applied in a terminal having a touch screen display, for example. The method for displaying a document can include the following steps.

In step 301, an edge region of an electronic document is displayed on the touch screen display, the edge region containing an edge of the electronic document and one or more display elements.

The edge of the electronic document can overlap with the edge of display region of the touch screen display, and is not clearly indicated as an edge in the display region of the touch screen display.

In step 302, a movement of an object acting on the touch screen display is detected.

The object refers to a control object such as a finger of a user, a touch pen or other objects which can be detected by the touch screen display.

If the touch screen display does not support hovering touch, the object is required to directly act on the touch screen display.

If the touch screen display supports hovering touch, the object can directly act on the touch screen display, or the object can hover with a space interval to act on the touch screen display.

When the object moves, the terminal detects the movement of the object through the touch screen display. For example, the movement can be a movement away from an edge in an edge region.

In step 303, in response to the movement of the object, display states of n rows of display elements which are closest to the edge are maintained unchanged, and remaining rows of display elements apart from the n rows of display elements which are closest to the edge are stretched for display in the direction away from the edge, wherein n is a positive integer.

Stretching for display refers to a display manner of enlarging a display element in a direction away from the edge. The edge refers to the edge away from which the object moves.

A stretch ratio for each of the display elements may be the same. Alternatively, the stretch ratio for each of the display elements positively correlates to a first distance which is a distance between the display element and the edge.

Figure 3B:
FIGS. 3B to 3E are schematic interfaces of the exemplary embodiment shown in FIG. 3A in implementation.

As an example, referring to FIG. 3B, an electronic document is an interaction interface 32 of a contact list application. The interaction interface 32 contains a title row 322 and ten rows of calling records. However, since the touch screen display 33 has a relatively small display region, only an edge region 32a of the interaction interface 32 can be displayed. The edge region 32a contains an upper edge 36 of the interaction interface 32 and former seven rows of calling records. Wherein, the upper edge 36 of the interaction interface 32 overlaps with the upper edge of the touch screen display 33, and not clearly indicated as an edge in FIG. 3B.

Figure 3C:
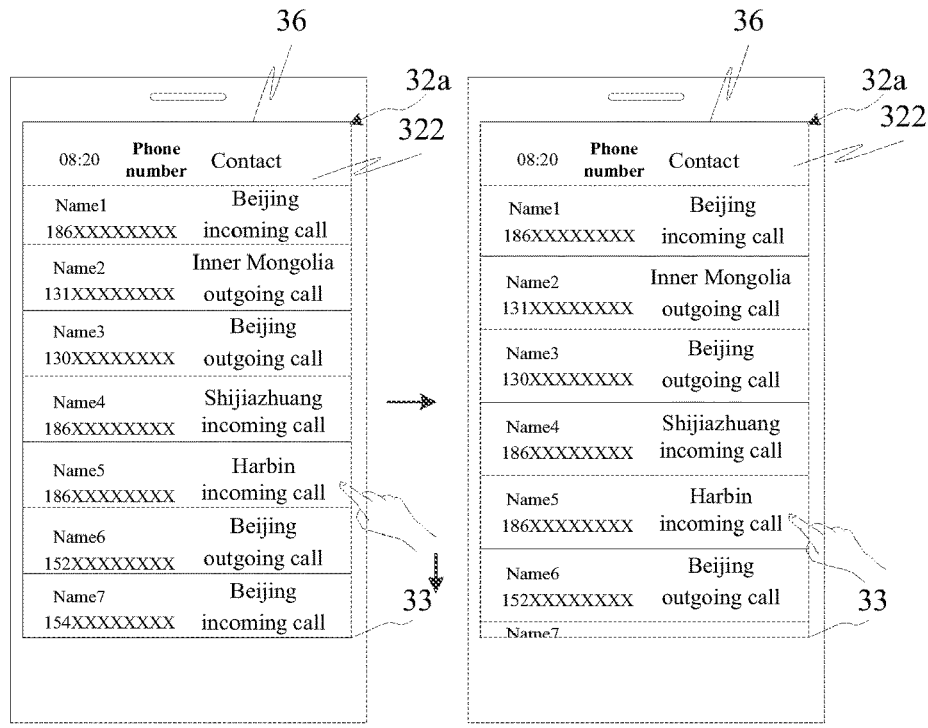
Figure 3D:
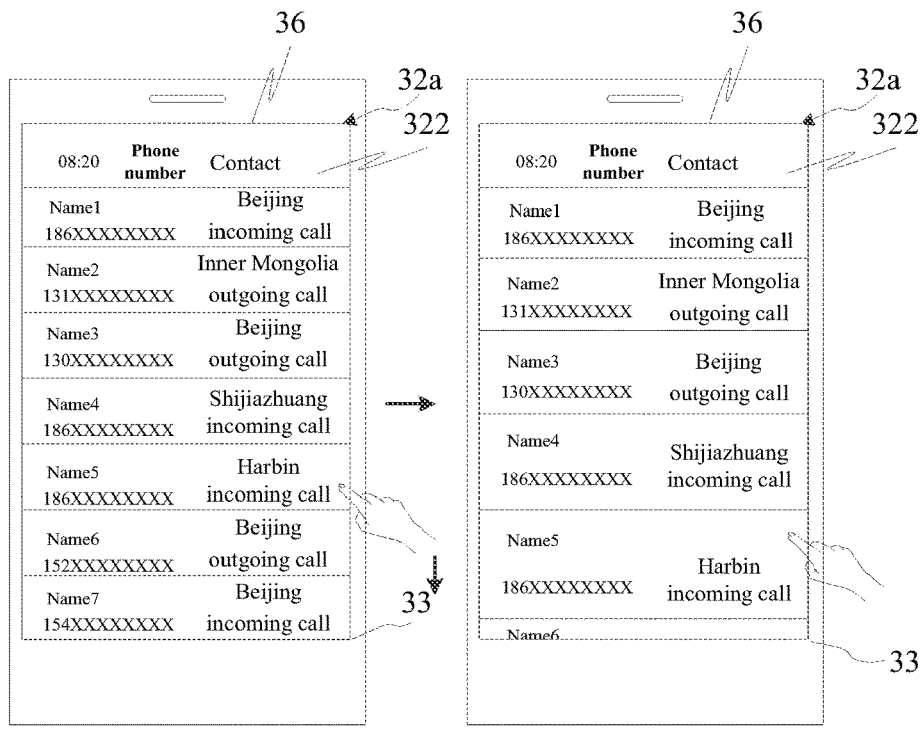

Referring to FIGS. 3C and 3D, when an object (for example a finger of a user) moves downward on the touch screen display 33, the terminal detects the movement of the finger through the touch screen display 33. In response to the movement of the finger, the terminal maintains the display state of the display elements in the row (i.e. the title row 322) closest to the upper edge 36 unchanged, and stretches for display the seven rows of calling records in the edge region 32a in the direction away from the upper edge 36. After the stretch, the widths of the rows of calling records are kept unchanged, and the heights thereof are increased.

As shown in the example of FIG. 3C, the stretch ratio for each of the rows of calling records is the same. That is, each of the rows of calling records has the same height after the stretch. The stretch ratio positively correlates to a moving distance of the finger. That is, the longer the moving distance of the finger on the touch screen display 33 is, the larger the stretch ratio is; and the shorter the moving distance of the finger on the touch screen display 33 is, the smaller the stretch ratio is. In addition, a part of the lowest row (the $7^{th}$ row) of calling records are moved out of the display region of the touch screen display 33 and are no longer displayed.

In the example of FIG. 3D, the stretch ratio for each of the rows of calling records is different from each other, and the stretch ratio for each of the rows of calling records positively correlates to a first distance, and the first distance is a distance between a row of calling records and the upper edge 36. That is, the larger a distance between a stretched row of calling records and the upper edge 36 is, the larger a stretch ratio for the row of calling records is; and the smaller a distance between a stretched row of calling records and the upper edge 36 is, the smaller a stretch ratio for the row of calling records is. For example, the stretch ratio for the $6^{th}$ row of calling records is larger than the stretch ratio of the $5^{th}$ row of calling records, the stretch ratio for the $5^{th}$ row of calling records is larger than the stretch ratio of the $4^{th}$ row of calling records, and the stretch ratio for the $4^{th}$ row of calling records is larger than the stretch ratio of the $3^{th}$ row of calling records. In addition, a part of the calling records in the lowest row (the $6^{th}$ row) and all of calling records in the $7^{th}$ row are moved out of the display region of the touch screen display 33 and are no longer displayed.

In step 304, when it is detected that the object is no longer on the touch screen display, the display elements that have been stretched for display are recovered to display states before the stretch.

When it is detected that the object is no longer on the touch screen display, the terminal recovers the display elements that have been stretched for display to display states before the stretch. The recovering process can be regarded as an inverse process of step 303. However, unlike step 303 in which the stretch follows the movement of the object, in step 304, the recovering process is performed at a preset rate or in a preset time.

In other words, the terminal can recover the display elements that have been stretched for display to display states before the stretch at a preset rate. The preset rate can be a uniform rate, a uniform deceleration rate, a uniform acceleration rate, a rate positively correlating to the stretch rate, or the like. The present embodiment does not limit the preset rate.

Alternatively, the terminal can recover the display elements that have been stretched for display to display states before the stretch in a preset time. The preset time can be 0.3 second.

Figure 3E:
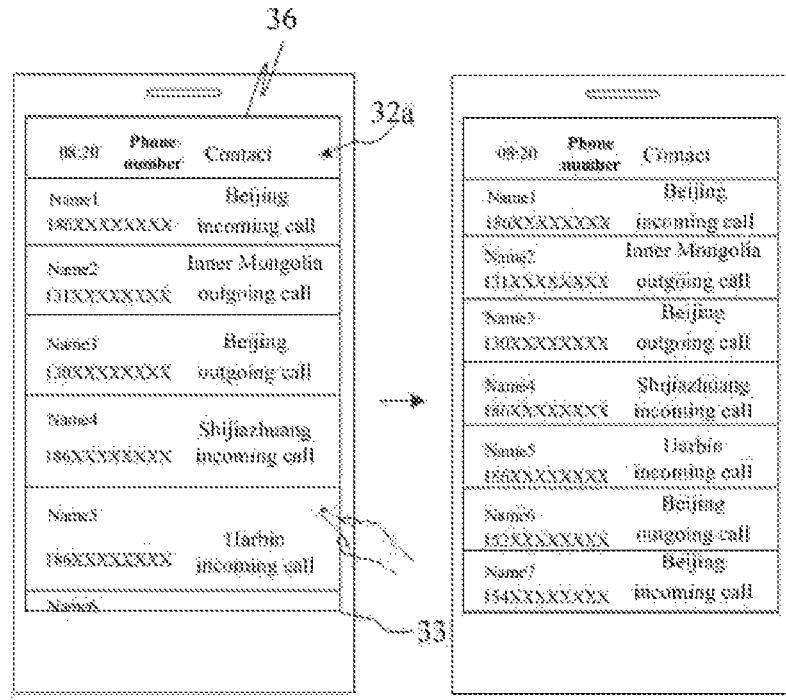

As an example, as shown in FIG. 3E, when it is detected that the finger is no longer on the touch screen display 33, the terminal recovers the seven rows of calling records that have been stretched for display to display states before the stretch in 0.3 second.

It should be noted that, in both of the stretch for display process and the recovering for display process as described above, the terminal maintains the display state of the edge of the electronic document unchanged.

As another possibility of step 304, if it is detected that the object is still on the touch screen display and the object remains still and no longer moves, the terminal maintains the current display state unchanged.

Accordingly, in the method for displaying a document provided by the present embodiment, when display reaches an edge region of an electronic document, one or more display elements are stretched for display in a direction away from the edge of the electronic document, as a response to a move operation of the user. Thereby, it reminds the user that the display has reached the edge of the electronic document, prevents the user from repeating move operation which is practically inapplicable, and thus improves efficiency of user operation.

Further, in the method for displaying a document provided by the present embodiment, the display elements that have been stretched for display are recovered to display states before the stretch. Thereby, other operations can be performed on the electronic document that is recovered to the display state before the stretch, so as not to influence subsequent normal use of the electronic document.

Figure 4A:
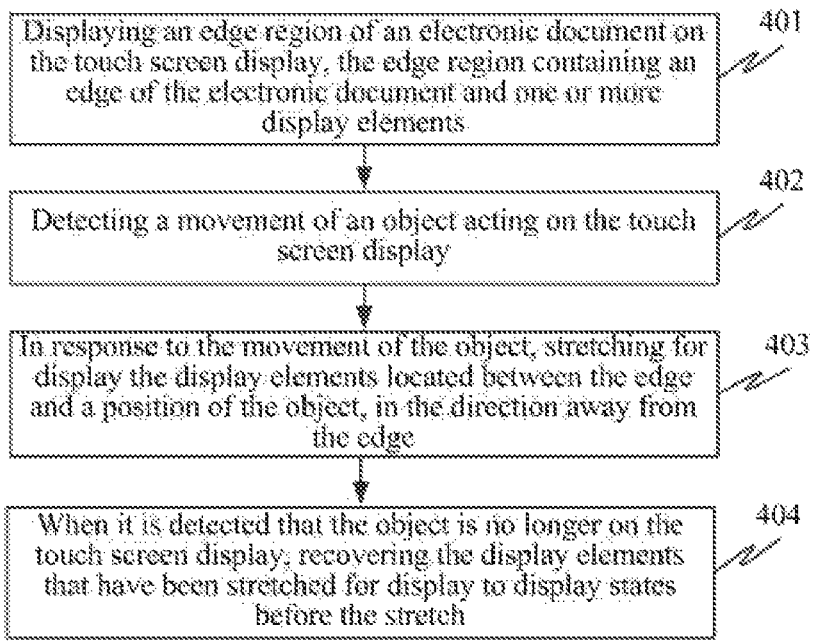
FIG. 4A is a flow chart of a method for displaying a document on a touch screen display according to another exemplary embodiment.

FIG. 4A is a flow chart of a method for displaying a document on a touch screen display according to another exemplary embodiment. In the present embodiment, the method for displaying a document is described as applied in a terminal having a touch screen display, for example. The method for displaying a document can include the following steps.

In step 401, an edge region of an electronic document is displayed on the touch screen display, the edge region containing an edge of the electronic document and one or more display elements.

The edge of the electronic document can overlap with the edge of display region of the touch screen display, and is not clearly indicated as an edge in the display region of the touch screen display.

In step 402, a movement of an object acting on the touch screen display is detected.

The object refers to a control object such as a finger of a user, a touch pen or other objects which can be detected by the touch screen display.

If the touch screen display does not support hovering touch, the object is required to directly act on the touch screen display.

If the touch screen display supports hovering touch, the object can directly act on the touch screen display, or the object can hover with a space interval to act on the touch screen display.

When the object moves, the terminal detects the movement of the object through the touch screen display. For example, the movement can be a movement away from an edge in an edge region.

In step 403, in response to the movement of the object, the display elements located between the edge and a position of the object are stretched for display in the direction away from the edge.

As a response to the movement of the object, the terminal stretches for display the display elements located between the edge and a position of the object in the direction away from the edge. The edge refers to the edge away from which the object moves.

Stretching for display refers to a display manner of enlarging a display element in a direction away from the edge. The position of the object is the corresponding position where the object acts on the touch screen display.

Wherein, a stretch ratio for each of the display elements is the same. Alternatively, the stretch ratio for each of the display elements positively correlates to a first distance which is a distance between the display element and the edge.

Figure 4B:
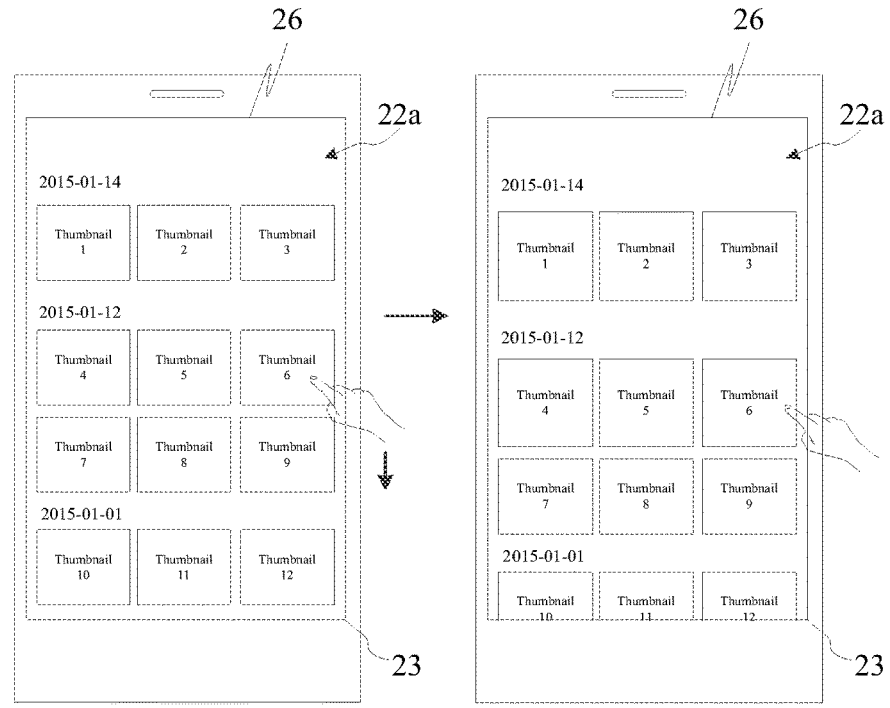
FIGS. 4B to 4D are schematic interfaces of the exemplary embodiment shown in FIG. 4A in implementation.
Figure 4C:
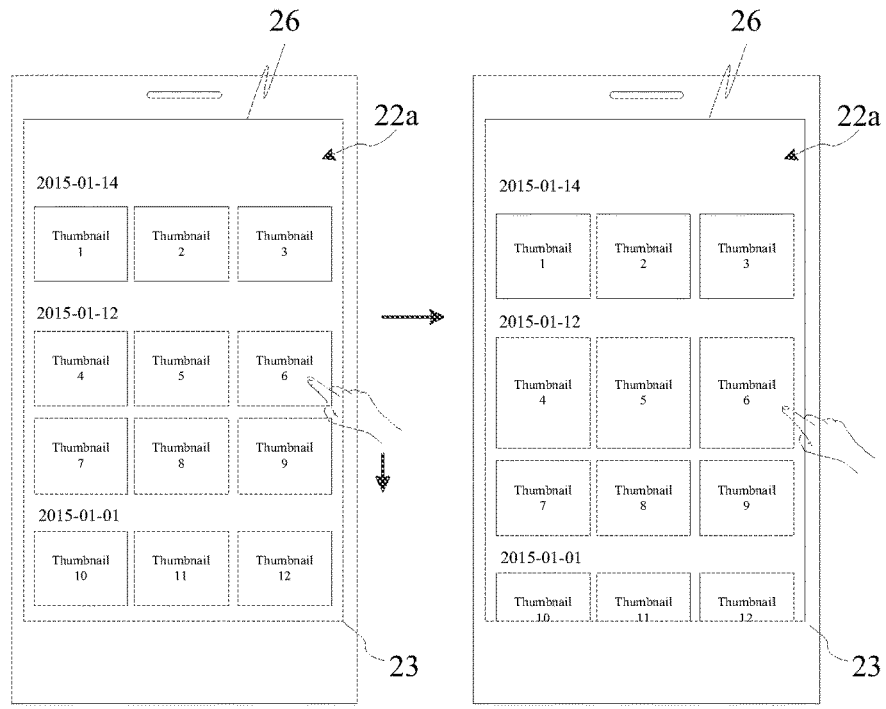

As an example, referring to FIGS. 4B and 4C, the electronic document is also the interaction interface 22 of the picture application and the object is also the finger of the user, for example. When the finger moves downward on the touch screen display 23, the terminal detects the movement of the finger through the touch screen display 23. In response to the movement of the finger, the terminal stretches for display the six thumbnails between the position of the finger and the upper edge 26 in the edge region 22a in the direction away from the upper edge 26. Widths of the thumbnails remain unchanged after the stretch, while heights thereof are increased. Moreover, an interval between every two rows of stretched thumbnails can be generally kept unchanged, or an interval between every two rows of stretched thumbnails can also be stretched for display.

The thumbnails 7 to 12 at the other side of the position of the finger are not stretched for display, and a part of the thumbnails 10, 11 and 12 are moved out of the display region of the touch screen display 23 and are no longer displayed.

As shown in the example of FIG. 4B, the stretch ratio for each of the thumbnails is the same. That is, each of the thumbnails has the same height after the stretch. The stretch ratio positively correlates to a moving distance of the finger. That is, the longer the moving distance of the finger on the touch screen display 23 is, the larger the stretch ratio is; and the shorter the moving distance of the finger on the touch screen display 23 is, the smaller the stretch ratio is.

In the example of FIG. 4C, the stretch ratio for each of the thumbnails is different from each other, and the stretch ratio for each of the thumbnails positively correlates to a first distance, and the first distance is a distance between a thumbnail and the upper edge 26. That is, the larger a distance between a stretched thumbnail and the upper edge 26 is, the larger a stretch ratio for the thumbnail is; and the smaller a distance between a stretched thumbnail and the upper edge 26 is, the smaller a stretch ratio for the thumbnail is. For example, the thumbnails 4, 5 and 6 are stretched with a first stretch ratio, the thumbnails 1, 2 and 3 are stretched with a second stretch ratio, and the first stretch ratio is larger than the second stretch ratio.

In step 404, when it is detected that the object is no longer on the touch screen display, the display elements that have been stretched for display are recovered to display states before the stretch.

When it is detected that the object is no longer on the touch screen display, the terminal recovers the display elements that have been stretched for display to display states before the stretch. The recovering process can be regarded as an inverse process of step 403. However, unlike step 403 in which the stretch follows the movement of the object, in step 404, the recovering process is performed at a preset rate or in a preset time.

In other words, the terminal can recover the display elements that have been stretched for display to display states before the stretch at a preset rate. The preset rate can be a uniform rate, a uniform deceleration rate, a uniform acceleration rate, a rate positively correlating to the stretch rate, or the like. The present embodiment does not limit the preset rate.

Alternatively, the terminal can recover the display elements that have been stretched for display to display states before the stretch in a preset time. The preset time can be 0.4 second.

Figure 4D:
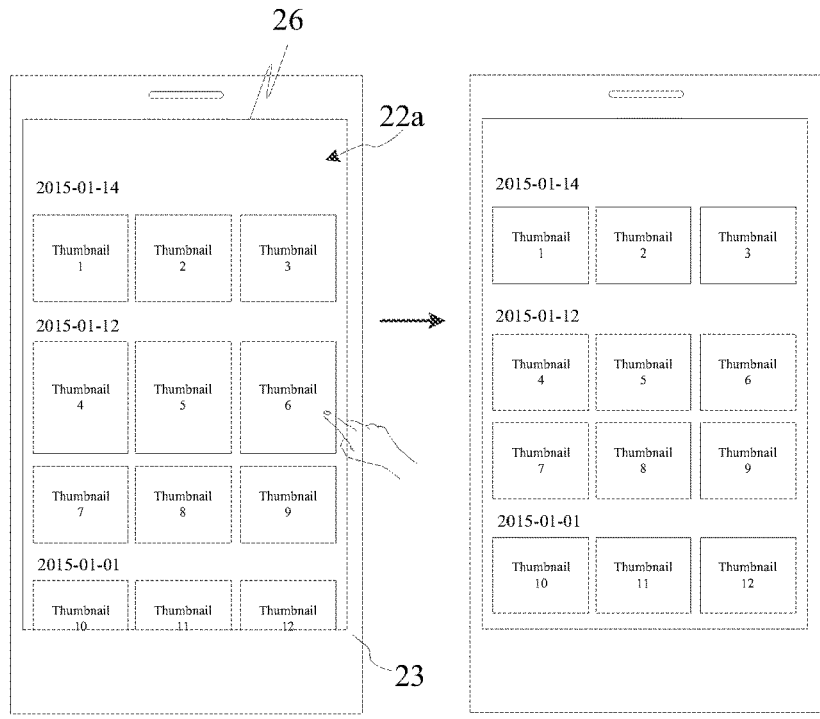

As an example, as shown in FIG. 4D, when it is detected that the finger is no longer on the touch screen display 23, the terminal recovers the six thumbnails that have been stretched for display to display states before the stretch in 0.4 second.

It should be noted that, in both of the stretch for display process and the recovering for display process as described above, the terminal maintains the display state of the edge of the electronic document unchanged.

As another possibility of step 404, if it is detected that the object is still on the touch screen display and the object remains still and no longer moves, the terminal maintains the current display state unchanged.

Accordingly, in the method for displaying a document provided by the present embodiment, when display reaches an edge region of an electronic document, one or more display elements are stretched for display in a direction away from the edge of the electronic document, as a response to a move operation of the user. Thereby, it reminds the user that the display has reached the edge of the electronic document, prevents the user from repeating move operation which is practically inapplicable, and thus improves efficiency of user operation.

Further, in the method for displaying a document provided by the present embodiment, the display elements that have been stretched for display are recovered to display states before the stretch. Thereby, after the user is reminded that the display has reached the edge of the electronic document, the display state can be recovered to the state before the stretch, to facilitate other operations of the user.

Figure 5A:
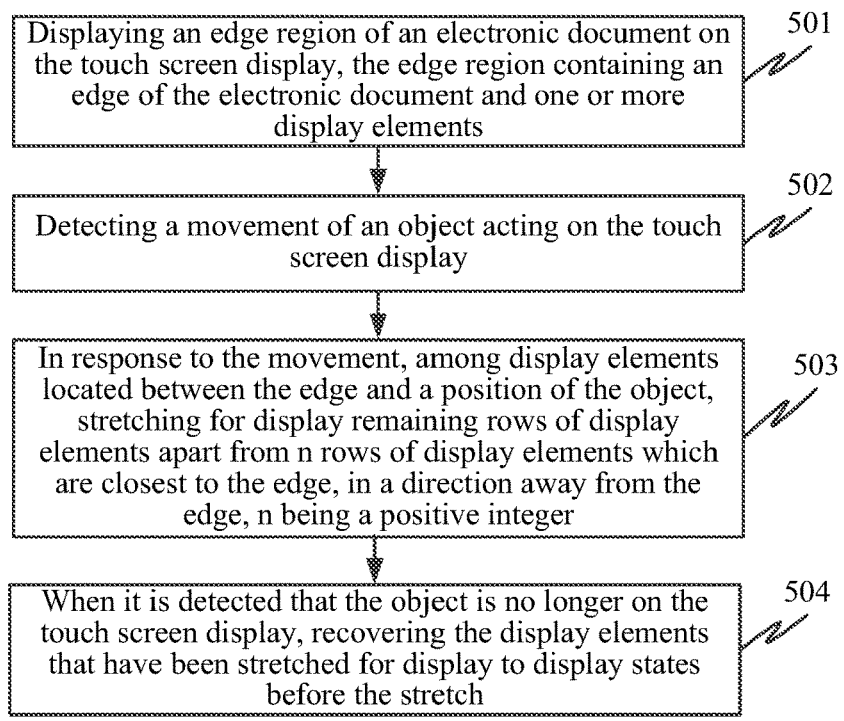
FIG. 5A is a flow chart of a method for displaying a document on a touch screen display according to another exemplary embodiment.

FIG. 5A is a flow chart of a method for displaying a document on a touch screen display according to another exemplary embodiment. In the present embodiment, the method for displaying a document is described as applied in a terminal having a touch screen display, for example. The method for displaying a document can include the following steps.

In step 501, an edge region of an electronic document is displayed on the touch screen display, the edge region containing an edge of the electronic document and one or more display elements.

The edge of the electronic document can overlap with the edge of display region of the touch screen display, and is not clearly indicated as an edge in the display region of the touch screen display.

In step 502, a movement of an object acting on the touch screen display is detected.

The object refers to a control object such as a finger of a user, a touch pen or other objects which can be detected by the touch screen display.

If the touch screen display does not support hovering touch, the object is required to directly act on the touch screen display.

If the touch screen display supports hovering touch, the object can directly act on the touch screen display, or the object can hover with a space interval to act on the touch screen display.

When the object moves, the terminal detects the movement of the object through the touch screen display. For example, the movement can be a movement away from an edge in an edge region.

In step 503, in response to the movement of the object, among display elements located between the edge and a position of the object, remaining rows of display elements apart from n rows of display elements which are closest to the edge are, stretched for display in a direction away from the edge, wherein n is a positive integer.

Stretching for display refers to a display manner by enlarging a display element in a direction away from the edge. The edge refers to the edge away from which the object moves.

A stretch ratio for each of the display elements is the same. Alternatively, the stretch ratio for each of the display elements positively correlates to a first distance which is a distance between the display element and the edge.

Figure 5B:
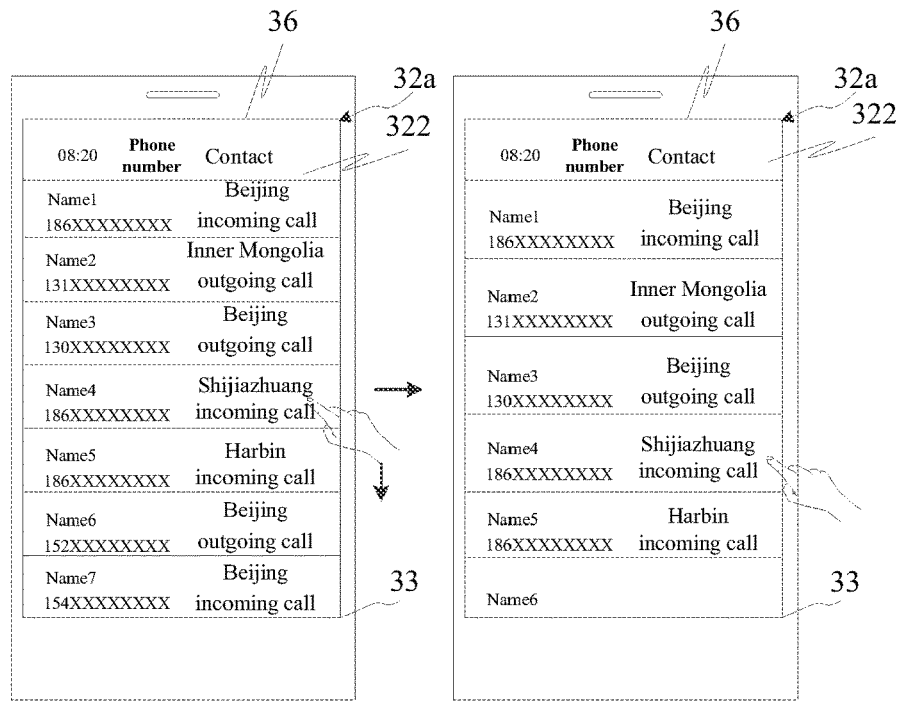
FIGS. 5B to 5D are schematic interfaces of the exemplary embodiment shown in FIG. 5A in implementation.
Figure 5C:
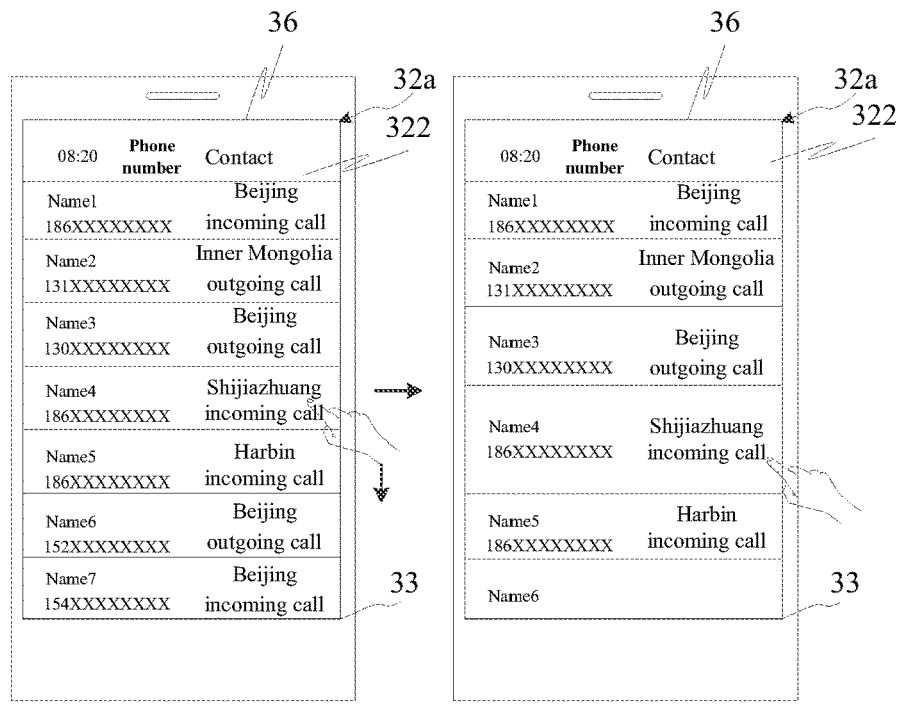

As an example, referring to FIGS. 5B and 5C, for example, the electronic document is the interaction interface 32 of the contact list application, the object is the finger of the user, and n=1. When the finger moves downward on the touch screen display 33, the terminal detects the movement of the finger through the touch screen display 33. In response to the movement of the finger, among the display elements located between the upper edge 36 and the position of the finger, the terminal maintains the display state of the display elements in the row (i.e. the title row 322) closest to the upper edge 36 unchanged, and stretches for display the $1^{st}$ to the $4^{th}$ row of calling records in the direction away from the upper edge 36. After the stretch, the widths of the rows of calling records are kept unchanged, and the heights thereof are increased.

Wherein, as shown in the example of FIG. 5B, the stretch ratio for each of the $1^{st}$ to the $4^{th}$ row of calling records is the same. That is, each of the rows of calling records has the same height after the stretch. The stretch ratio positively correlates to a moving distance of the finger. That is, the longer the moving distance of the finger on the touch screen display 33 is, the larger the stretch ratio is; and the shorter the moving distance of the finger on the touch screen display 33 is, the smaller the stretch ratio is. In addition, a part of the calling records in the $6^{th}$ row and all of the calling records in the lowest row (the $7^{th}$ row) are moved out of the display region of the touch screen display 33 and are no longer displayed.

In the example of FIG. 5C, the stretch ratio for each of the rows of calling records is different from each other, and the stretch ratio for each of the rows of calling records positively correlates to a first distance, and the first distance is a distance between a row of calling records and the upper edge 36. That is, the larger a distance between a stretched row of calling records and the upper edge 36 is, the larger a stretch ratio for the row of calling records is; and the smaller a distance between a stretched row of calling records and the upper edge 36 is, the smaller a stretch ratio for the row of calling records is. For example, the stretch ratio for the $4^{th}$ row of calling records is larger than the stretch ratio of the $3^{th}$ row of calling records, the stretch ratio for the $3^{th}$ row of calling records is larger than the stretch ratio of the $2^{nd}$ row of calling records, and the stretch ratio for the $2^{nd}$ row of calling records is larger than the stretch ratio of the $1^{St}$ row of calling records. In addition, a part of the calling records in the lowest row (the $6^{th}$ row) of and all of the calling records in the $7^{th}$ row are moved out of the display region of the touch screen display 33 and are no longer displayed.

In step 504, when it is detected that the object is no longer on the touch screen display, the display elements that have been stretched for display are recovered to display states before the stretch.

When it is detected that the object is no longer on the touch screen display, the terminal recovers the display elements that have been stretched for display to display states before the stretch. The recovering process can be regarded as an inverse process of step 503. However, unlike step 503 in which the stretch follows the movement of the object, in step 504, the recovering process is performed at a preset rate or in a preset time.

In other words, the terminal can recover the display elements that have been stretched for display to display states before the stretch at a preset rate. The preset rate can be a uniform rate, a uniform deceleration rate, a uniform acceleration rate, a rate positively correlating to the stretch rate, or the like. The present embodiment does not limit the preset rate.

Alternatively, the terminal can recover the display elements that have been stretched for display to display states before the stretch in a preset time. The preset time can be 0.4 second.

Figure 5D:
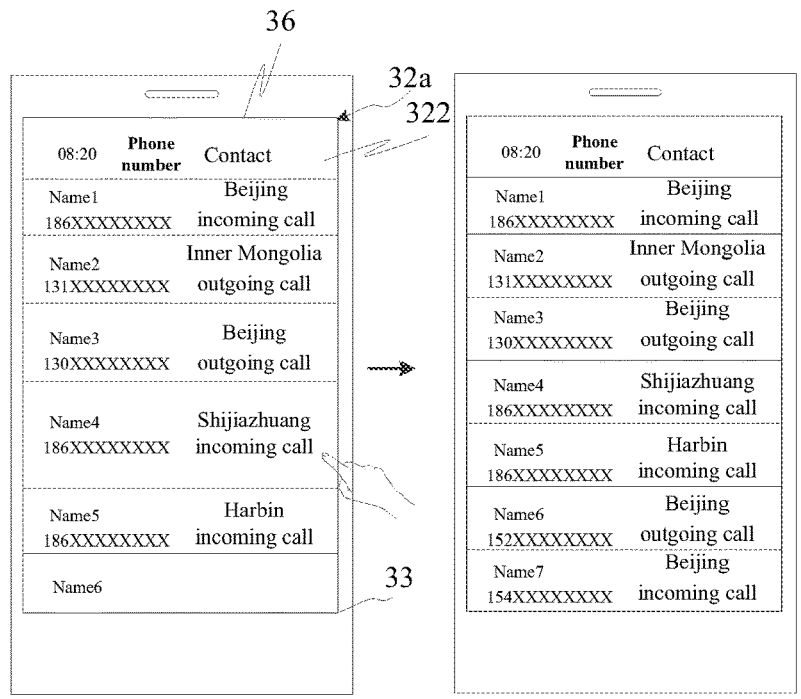

As an example, as shown in FIG. 5D, when it is detected that the finger is no longer on the touch screen display 33, the terminal recovers the seven rows of calling records that have been stretched for display to display states before the stretch in 0.4 second.

It should be noted that, in both of the stretch for display process and the recovering for display process as described above, the terminal maintains the display state of the edge of the electronic document unchanged.

As another possibility of step 504, if it is detected that the object is still on the touch screen display and the object remains still and no longer moves, the terminal maintains the current display state unchanged.

Accordingly, in the method for displaying a document provided by the present embodiment, when display reaches an edge region of an electronic document, one or more display elements are stretched for display in a direction away from the edge of the electronic document, as a response to a move operation of the user. Thereby, it reminds the user that the display has reached the edge of the electronic document, prevents the user from repeating move operation which is practically inapplicable, and thus improves efficiency of user operation.

Further, in the method for displaying a document provided by the present embodiment, the display elements that have been stretched for display are recovered to display states before the stretch. Thereby, after the user is reminded that the display has reached the edge of the electronic document, the display state can be recovered to the state before the stretch, to facilitate other operations of the user.

Figure 6A:
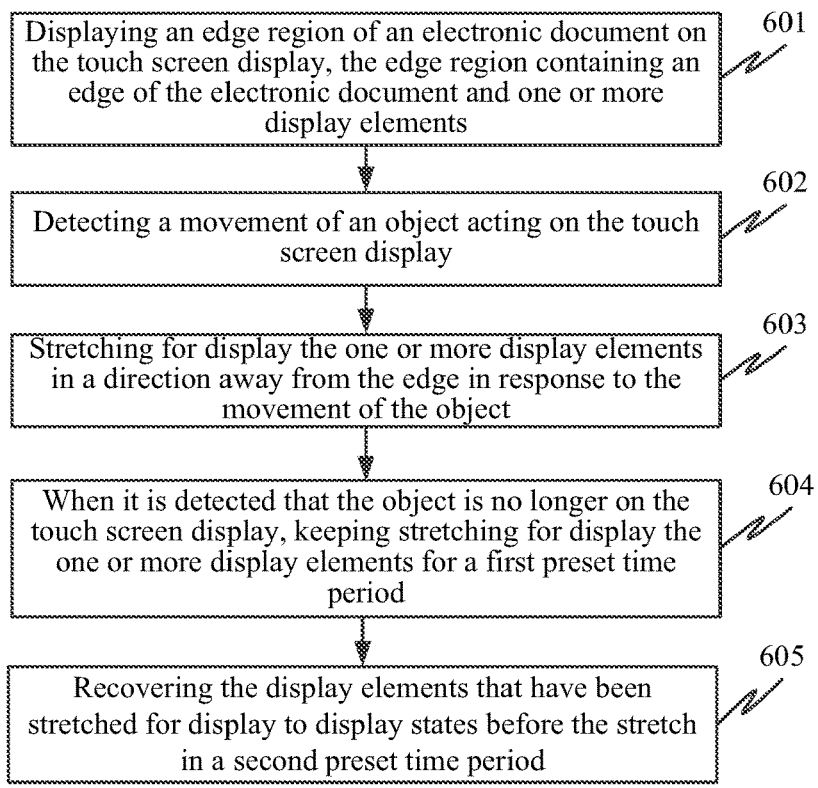
FIG. 6A is a flow chart of a method for displaying a document on a touch screen display according to another exemplary embodiment.

FIG. 6A is a flow chart of a method for displaying a document on a touch screen display according to another exemplary embodiment. In the present embodiment, the method for displaying a document is described as applied in a terminal having a touch screen display, for example. The method for displaying a document can include the following steps.

In step 601, an edge region of an electronic document is displayed on the touch screen display, the edge region containing an edge of the electronic document and one or more display elements.

In step 602, a movement of an object acting on the touch screen display is detected. The movement can be a movement away from an edge in an edge region.

In step 603, the one or more display elements are stretched for display in a direction away from the edge, in response to the movement of the object.

The step 603 can be implemented as any one of steps 203, 303, 403 and 503.

In step 604, when it is detected that the object is no longer on the touch screen display, the one or more display elements are kept to be stretched for display for a first preset time period.

During the process of, stretching for display, the stretch rate is related to the moving rate of the object.

When it is detected that the object is no longer on the touch screen display, the terminal keeps stretching, for display, the one or more display elements for a first preset time period. The first preset time period can be 0.2 second.

Figure 6B:
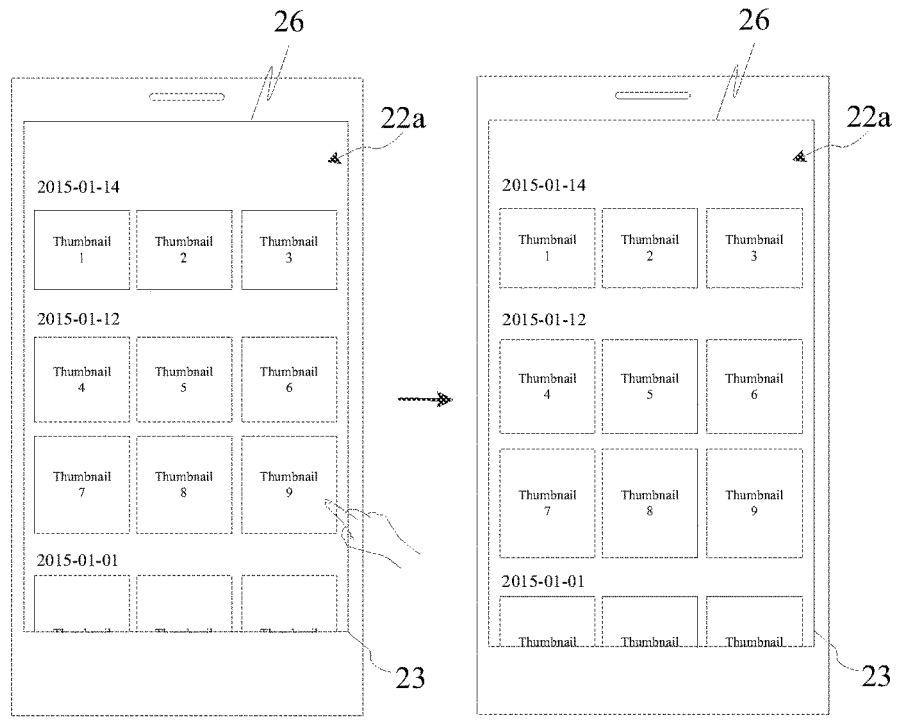
FIGS. 6B to 6C are schematic interfaces of the exemplary embodiment shown in FIG. 6A in implementation.

As an example, referring to FIG. 6B, for example, the electronic document is also the interaction interface of the picture application and the object is also the finger of the user, for example. When the finger moves downward on the touch screen display 23, the terminal detects the movement of the finger through the touch screen display 23. In response to the movement of the finger, the terminal stretches for display stretches the six thumbnails between the position of the finger and the upper edge 26 in the edge region 22*a* in the direction away from the upper edge 26. When it is detected that the finger is no longer on the touch screen display 23, the terminal keeps stretching, for display, the six thumbnails in the direction away from the upper edge 26 in 0.2 second.

In step 605, the display elements that have been stretched for display are recovered to display states before the stretch in a second preset time period.

After it stops the stretch, the terminal can recover the display elements that have been stretched for display to display states before the stretch in a second preset time period. The second preset time period can be 0.4 second.

Figure 6C:
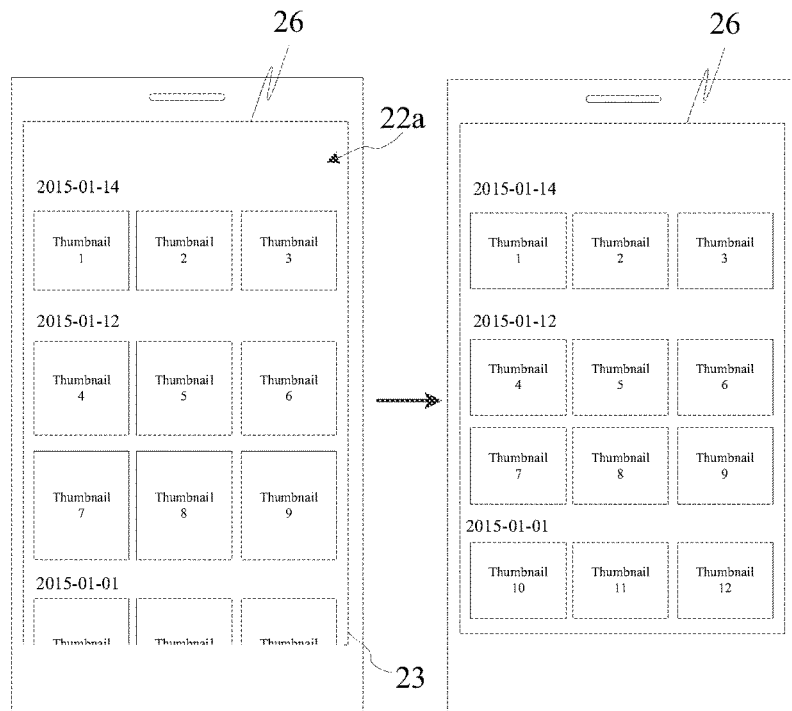

As an example, referring to FIG. 6C, after it keeps stretching, for display, the 6 thumbnails in the direction away from the upper edge 26, the terminal recovers the display elements that have been stretched for display to display states before the stretch in 0.4 second.

As another possibility of step 604, if it is detected that the object is still on the touch screen display and the object remains still and no longer moves, the terminal maintains the current display state unchanged.

Accordingly, further in the method for displaying a document provided by the present embodiment, when it is detected that the object is no longer on the touch screen display, the one or more display elements are kept to be stretched for display. Thereby, after the finger of the user leaves the touch screen display, without obstruction of the finger, the user can clearly observe the display elements that have been stretched for display, so as to clearly learn that the display has reached the edge of the electronic document.

It should be noted that, prior to step 604, the terminal can also perform the following steps:

First, detecting whether a moving speed of the object exceeds a preset threshold before it is detected that the object is no longer on the touch screen display.

Second, if it exceeds the preset threshold, performing step 604.

Third, if it does not exceed the preset threshold, performing step 504.

Figure 7A:
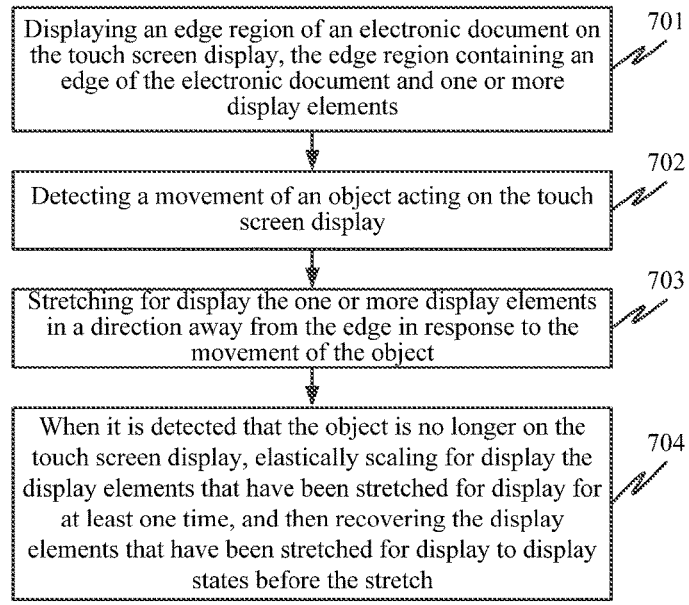
FIG. 7A is a flow chart of a method for displaying a document on a touch screen display according to another exemplary embodiment.

FIG. 7A is a flow chart of a method for displaying a document on a touch screen display according to another exemplary embodiment. In the present embodiment, the method for displaying a document is described as applied in a terminal having a touch screen display, for example. The method for displaying a document can include the following steps.

In step 701, an edge region of an electronic document is displayed on the touch screen display, the edge region containing an edge of the electronic document and one or more display elements.

In step 702, a movement of an object acting on the touch screen display is detected. The movement can be a movement away from an edge in an edge region.

In step 703, the one or more display elements are stretched for display in a direction away from the edge, in response to the movement of the object.

The step 703 can be implemented as any one of steps 203, 303, 403 and 503.

In step 704, when it is detected that the object is no longer on the touch screen display, the display elements that have been stretched for display are elastically scaled for display for at least one time, and then the display elements that have been stretched for display are recovered to display states before the stretch.

The one time elastic scaling for display is an animation display effect combined by successive scaling display and stretching display. The terminal can elastically scale for display the display elements that have been stretched for display for one time, and then recover them to the display state before the stretch. The terminal can also elastically scale for display the display elements that have been stretched for display for more than one time, and then recover them to the display state before the stretch. Between every twice of elastic scaling for display, the scaling ratio for the former elastic scaling is larger than the scaling ratio for the latter elastic scaling.

Figure 7B:
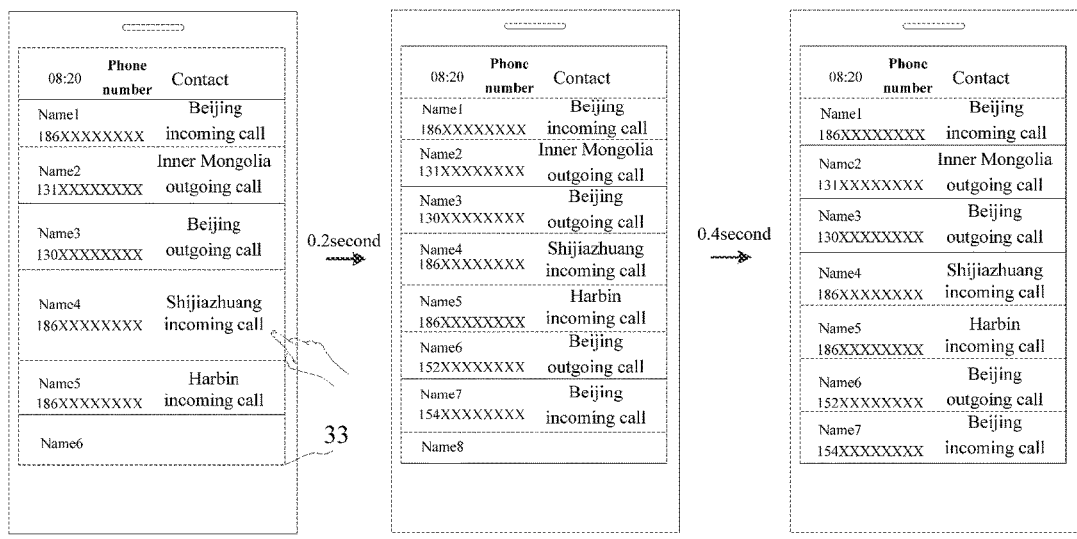
FIG. 7B is a schematic interface of the exemplary embodiment shown in FIG. 7A in implementation.

For example, as shown in FIG. 7B, a terminal performs elastic scaling for display for one time. When it is detected that the finger is no longer on the touch screen display 33, the terminal scales for display the seven rows of calling records that have been stretched for display in 0.2 second. After the scaling for display, the widths of the rows of the calling records remain unchanged, while the heights thereof are smaller than the original heights. Then, the terminal stretches for display the seven rows of calling records that have been scaled for display in 0.4 second, and resumes the display state before the stretch display following the movement of the object, i.e. the original display state. From the view of the user, after the finger leaves, the seven rows of calling records are elastically scaled for one time, and then recovered to the original display state.

However, the terminal can also perform elastic scaling display for more than one time, and then recover the display elements to the original display state.

It should be noted that, depending on the times of the elastic scaling for display, the scaling ratio for each time of elastic scaling for display can be different. The display effects of the elastic scaling display can be various, which will not be repeated herein, and it does not limit the form of the elastic scaling display.

In the above several embodiments, the terminal displaying an edge region of an electronic document can refer to it initially displaying an edge region of an electronic document, or can also refer to it displaying an edge region of an electronic document during a movement. Hereinafter, this is described with reference to three distinct embodiments.

First Implementation

Figure 8A:
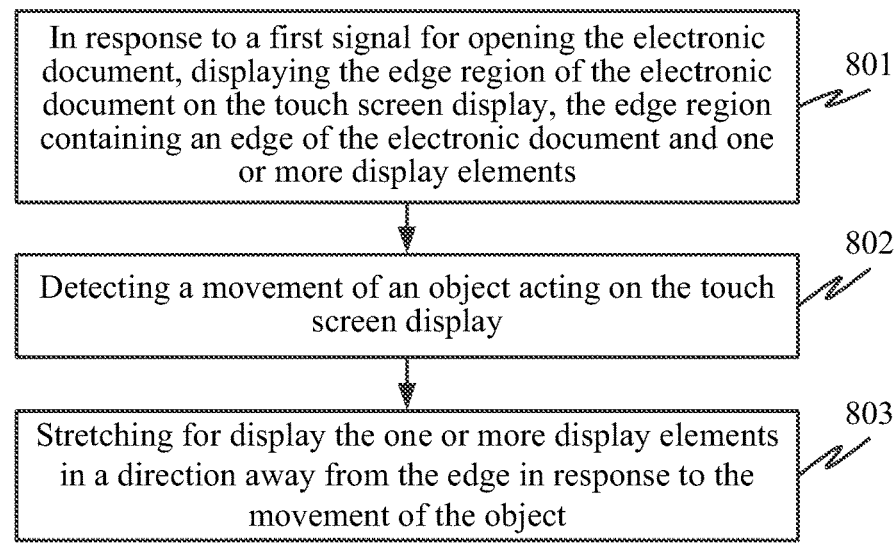
FIG. 8A is a flow chart of a method for displaying a document on a touch screen display according to another exemplary embodiment.

FIG. 8A is a flow chart of a method for displaying a document on a touch screen display according to another exemplary embodiment. In the present embodiment, the method for displaying a document is described as applied in a terminal having a touch screen display, for example. The method for displaying a document can include the following steps.

In step 801, in response to a first signal for opening the electronic document, the edge region of the electronic document is displayed on the touch screen display, the edge region containing an edge of the electronic document and one or more display elements.

When it displays a user interface, a terminal can receive a first signal for opening the electronic document triggered by a user, and the first signal can be a signal of clicking a shortcut or an icon corresponding to the electronic document.

Then, in response to the first signal, the terminal displays the edge region of the electronic document on the touch screen display, the edge region containing an edge of the electronic document and one or more display elements. The edge typically includes an upper edge, a left edge of the electronic document or both of them.

Figure 8B:
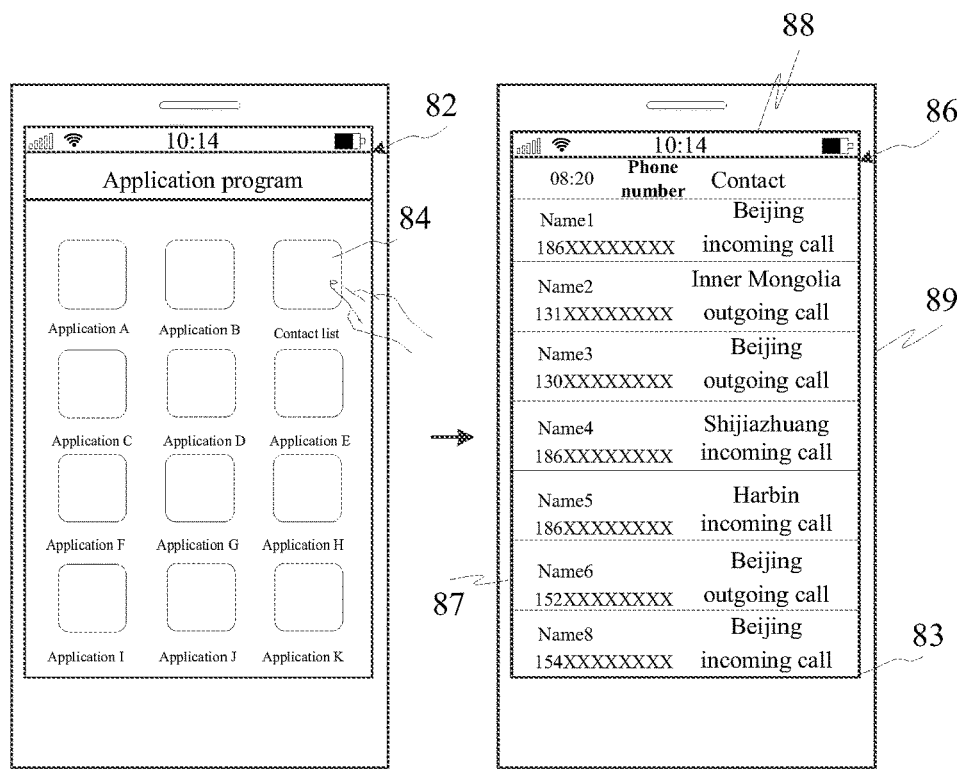
FIG. 8B is a schematic interface of the exemplary embodiment shown in FIG. 8A in implementation.

As an example, referring to FIG. 8B, the terminal firstly displays a shortcut interface 82. The shortcut interface 82 contains twelve application icons arranged in four rows and three columns. When the user clicks an icon 84 of a contact list application with his finger, a first signal is triggered. In response to the first signal, the terminal cancels display of the shortcut interface 82 on the touch screen display 83, and displays an electronic document which is an interaction interface 86 of the contact list application. The interaction interface 86 includes a left edge 87, an upper edge 88 and a right edge 89. However, since the interaction interface 86 has a length greater than a height of the touch screen display 83, the lower edge is not displayed.

In step 802, a movement of an object acting on the touch screen display is detected. The movement can be a movement away from an edge in an edge region.

In step 803, the one or more display elements are stretched for display in a direction away from the edge, in response to the movement of the object.

This step can be implemented as any one of steps 203, 303, 403 and 503.

Second Implementation

Figure 9A:
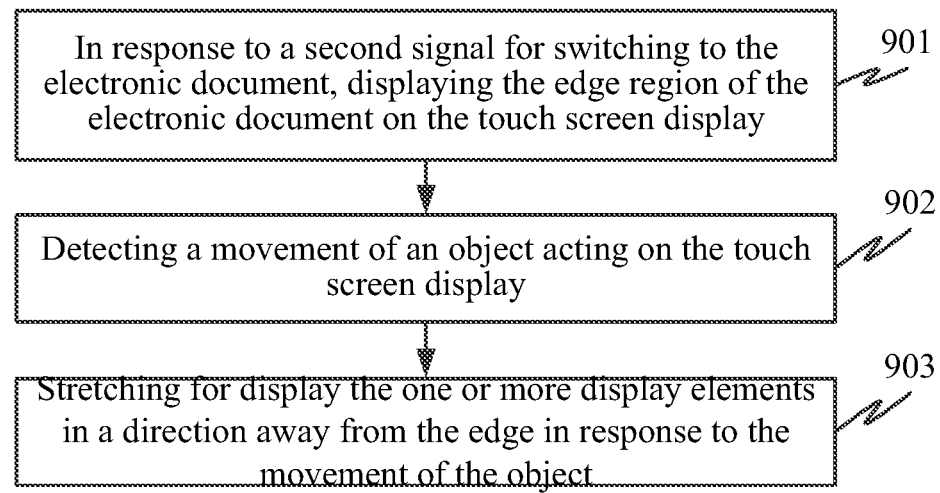
FIG. 9A is a flow chart of a method for displaying a document on a touch screen display according to another exemplary embodiment.

FIG. 9A is a flow chart of a method for displaying a document on a touch screen display according to another exemplary embodiment. In the present embodiment, the method for displaying a document is described as applied in a terminal having a touch screen display, for example. The method for displaying a document can include the following steps.

In step 901, in response to a second signal for switching to the electronic document, the edge region of the electronic document is displayed on the touch screen display.

When it is displaying an electronic document A, a terminal can receive a second signal for switching to an electronic document B, the second signal can be a signal of clicking a shortcut or an icon corresponding to the electronic document B.

Then, in response to the second signal, the terminal displays the edge region of the electronic document B on the touch screen display. The edge region contains an edge of the electronic document B and one or more display elements. The edge typically includes an upper edge, a left edge of the electronic document or both of them.

Figure 9B:
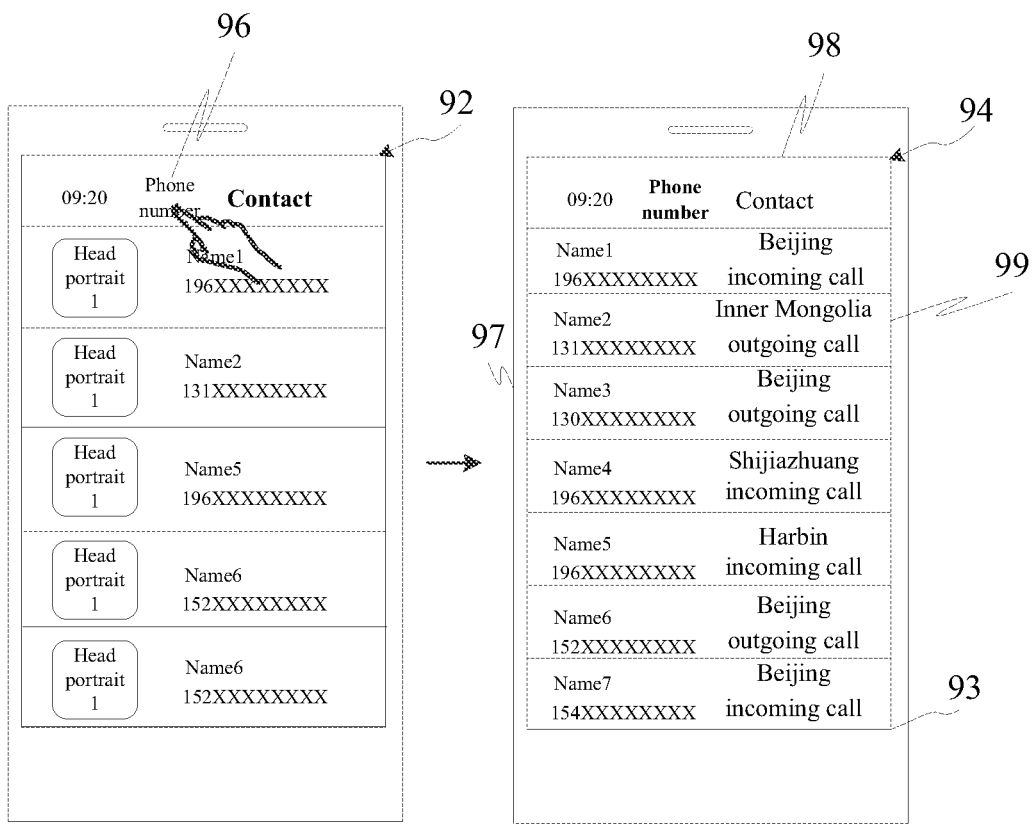
FIG. 9B is a schematic interface of the exemplary embodiment shown in FIG. 9A in implementation.

As an example, referring to FIG. 9B, it is assumed that the electronic document A is an interface of a contact list, and the electronic document B is an interface of calling records. The terminal firstly displays the interface 92 of a contact list for the contact list application. When the user clicks a widget 96 corresponding to the interface 94 of calling records in the upper of the interface 92 of a contact list with his finger. In response to the second signal, the terminal switches from the interface 92 of a contact list to the interface 94 of calling records on the touch screen display 93. The interface 94 of calling records includes a left edge 97, an upper edge 98 and a right edge 99. However, since the interface 94 of calling records has a length greater than a height of the touch screen display 93, the lower edge is not displayed.

In step 902, a movement of an object acting on the touch screen display is detected.

The movement can be a movement away from an edge in an edge region.

In step 903, the one or more display elements are stretched for display in a direction away from the edge, in response to the movement of the object.

This step can be implemented as any one of steps 203, 303, 403 and 503.

Third Implementation

Figure 10A:
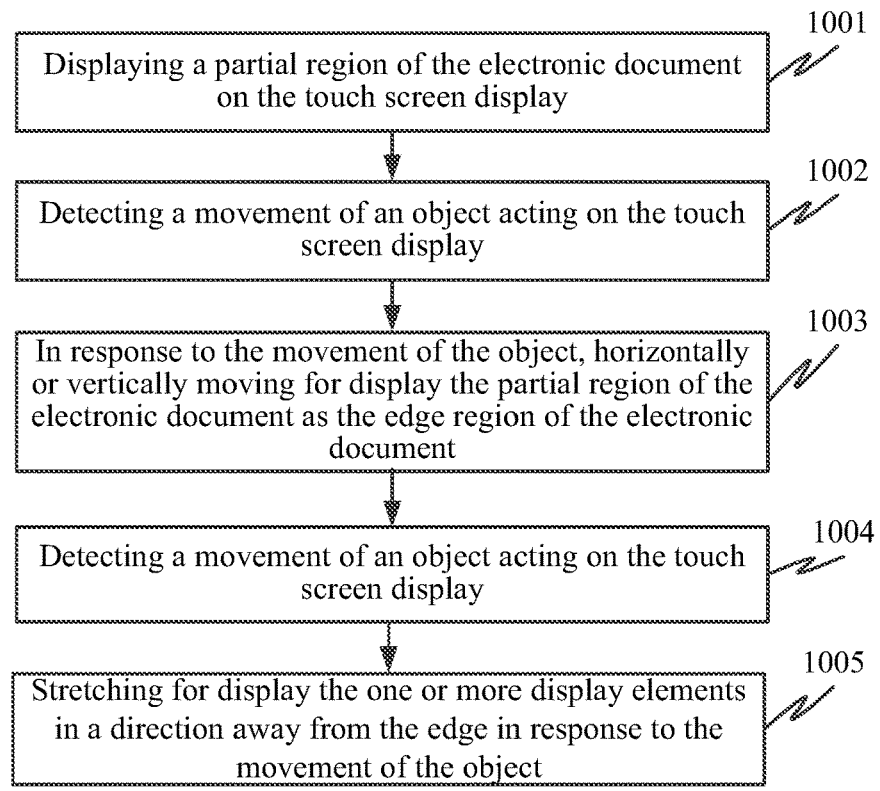
FIG. 10A is a flow chart of a method for displaying a document on a touch screen display according to another exemplary embodiment.

FIG. 10A is a flow chart of a method for displaying a document on a touch screen display according to another exemplary embodiment. In the present embodiment, the method for displaying a document is described as applied in a terminal having a touch screen display, for example. The method for displaying a document can include the following steps.

In step 1001, a partial region of the electronic document is displayed on the touch screen display.

When it is displaying an electronic document, the terminal can display a partial region of the electronic document. The partial region includes a part of the display elements of the electronic document.

Figure 10B:
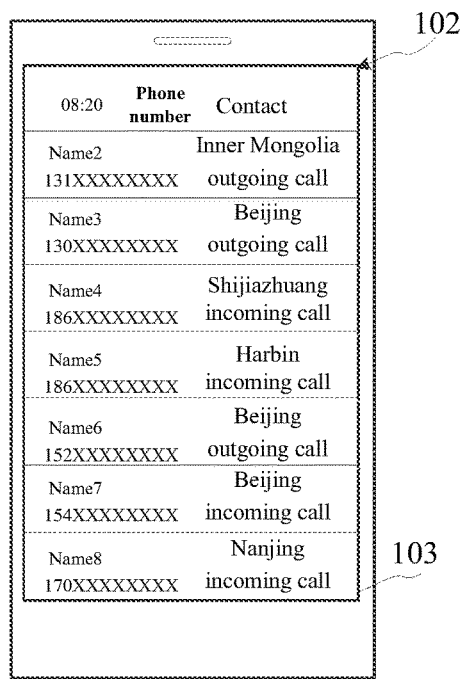
FIGS. 10B to 10D are schematic interfaces of the exemplary embodiment shown in FIG. 10A in implementation.

As an example, referring to FIG. 10B, it is assumed that the electronic document is an interface 102 of calling records, and a partial region of the interface 102 of calling records is displayed on the touch screen display 103. The partial region includes the $2^{nd}$ to $8^{th}$ rows of calling records.

In step 1002, a movement of an object acting on the touch screen display is detected.

The object refers to a control object such as a finger of a user, a touch pen or other objects which can be detected by the touch screen display.

When the object moves, the terminal detects the movement of the object through the touch screen display. For example, the movement can be a movement away from an edge in an edge region.

In step 1003, in response to the movement of the object, the partial region of the electronic document is moved for display as the edge region of the electronic document.

In response to the movement of the object, the terminal moves the electronic document for display.

Figure 10C:
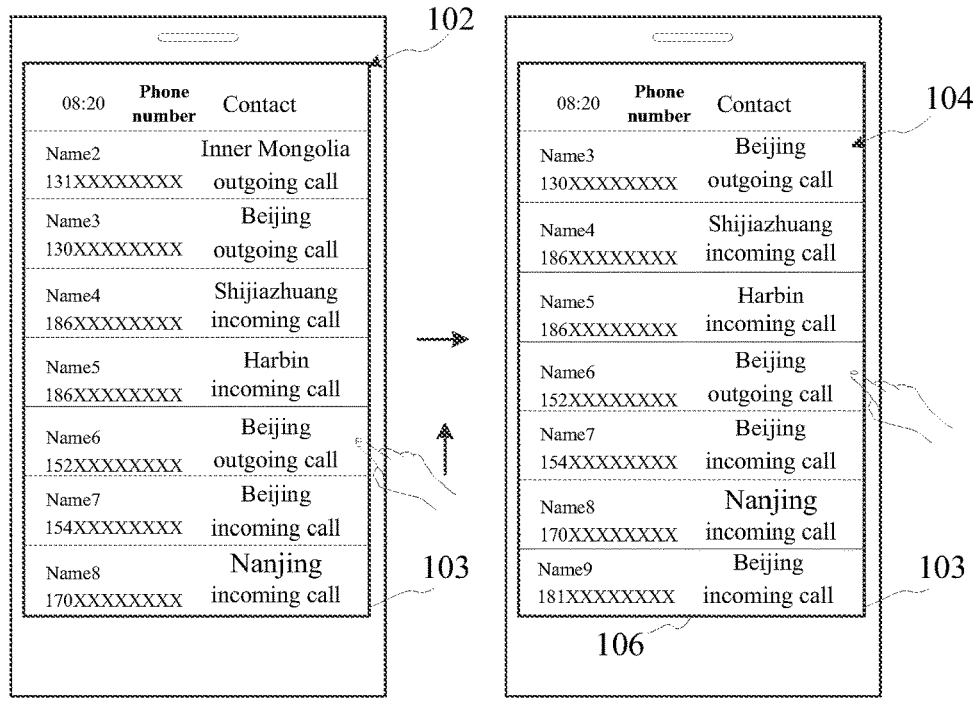

As an example, referring to FIG. 10C, for example, the object is a finger of a user. When the finger moves upward on the touch screen display 103, the terminal detects the movement of the finger through the touch screen display 103. In response to the movement, the terminal moves the partial region of electronic document upward for display, as an edge region 104. The edge region 104 includes the $3^{rd}$ to $9^{th}$ rows of calling records and a lower edge 106 of the interface of calling records.

In step 1004, a movement of an object acting on the touch screen display is detected.

The terminal continues to detect the movement of the object. The movement can be a movement following the movement in step 1002 without a stop, or can be another movement independent of the movement in step 1002.

The movement can be a movement away from the lower edge 106 in the edge region 104.

In step 1005, the one or more display elements are stretched for display in a direction away from the edge, in response to the movement of the object.

In response to the movement of the object, the one or more display elements are stretched for display in a direction away from the lower edge 106.

This step can be implemented as any one of steps 203, 303, 403 and 503.

Figure 10D:
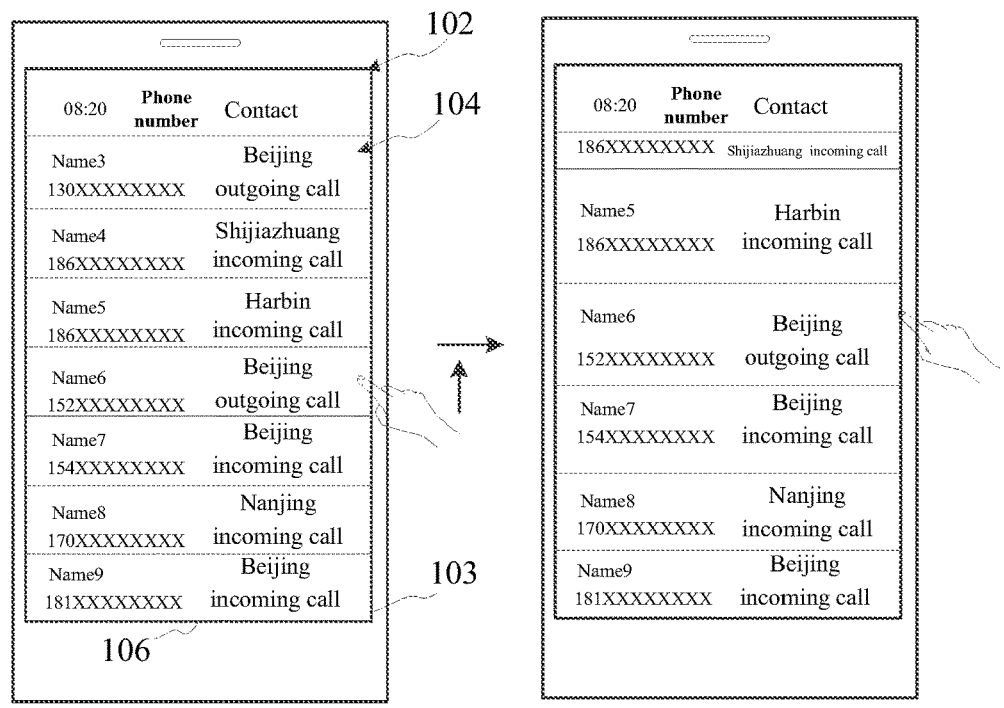

As an example, referring to FIG. 10D, after the edge region 104 is displayed, if the finger still moves upward on the touch screen display 103, in response to the movement of the finger, the terminal stretches for display the $3^{rd}$ to $9^{th}$ rows of calling records in the edge region 104 in the direction away from the lower edge 106.

It should be noted that, the method for displaying a document described in the above method embodiments, can be implemented in various operating systems, and underlying implementations in various operating systems can be different.

Figure 12A:
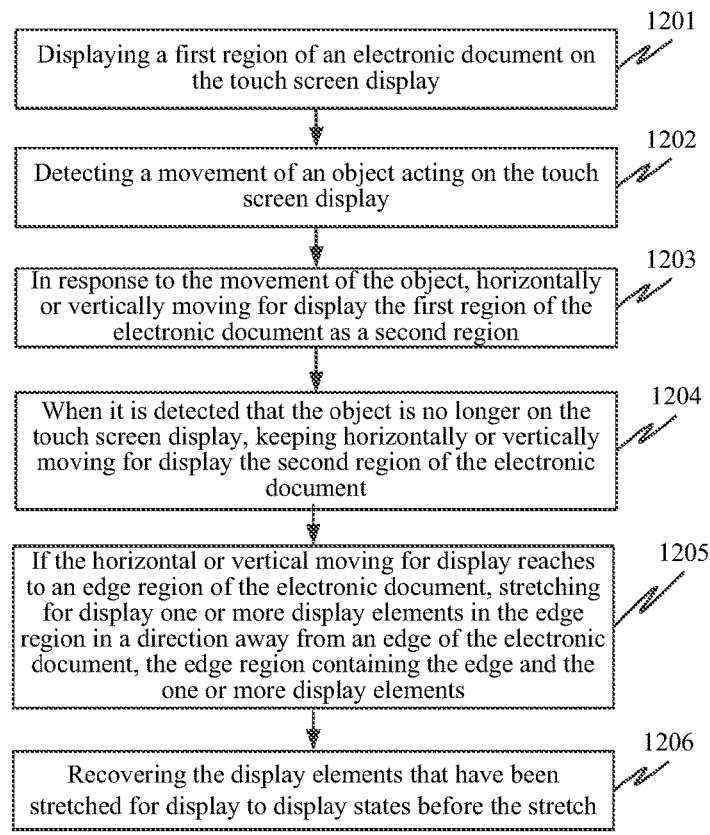
FIG. 12A is a flow chart of a method for displaying a document on a touch screen display according to another exemplary embodiment.

For example, if the stretch effect as shown in FIG. 2C, that is, the effect that all of the display elements are stretched for display with the same stretch ratio, is to be implemented in Android operating system, the method can include the following steps, as shown in FIG. 12A.

In step 1101, an elastic inertia value inertia is updated according to a moving distance of the object.

The elastic inertia value inertia indicates an elasticity degree when a display element is stretched for display. The initial value of the elastic inertia value inertia can be 0.

When an electronic document is stretched for display, the elastic inertia value inertia positively correlates to a moving distance of an object on the touch screen display. That is, the larger the moving distance of the object on the touch screen display is, the larger the elastic inertia value inertia is.

The terminal updates the elastic inertia value inertia according to the moving distance of the object at a predetermined time interval. The predetermined time interval can be smaller than or equal to a time interval for display between two frames of display images.

In step 1102, for a $n^{th}$ frame of display image, the terminal calculates a stretch ratio according to the current elastic inertia value inertia.

Since the images are displayed frame by frame, for a $n^{th}$ frame of display image, the terminal calculates a stretch ratio according to the current elastic inertia value inertia. The stretch ratio increases from a frame to another frame at a rate negatively correlating to the elastic inertia value inertia. That is, the larger the elastic inertia value inertia is, the smaller the rate at which the stretch ratio increases from a frame to another frame is; and the smaller the elastic inertia value inertia is, the larger the rate at which the stretch ratio increases from a frame to another frame is.

In step 1103, the terminal stretches the $1^{st}$ frame of display image according to the calculated stretch ratio, to obtain a $n^{th}$ frame of display image.

The terminal can put display elements to be stretched for display into a container. For example, all of the display elements of an entire electronic document are put into a container. Then, the terminal stretches the $1^{st}$ frame of display image according to the calculated stretch ratio, to obtain a $n^{th}$ frame of display image, wherein n>2.

Figure 11A:
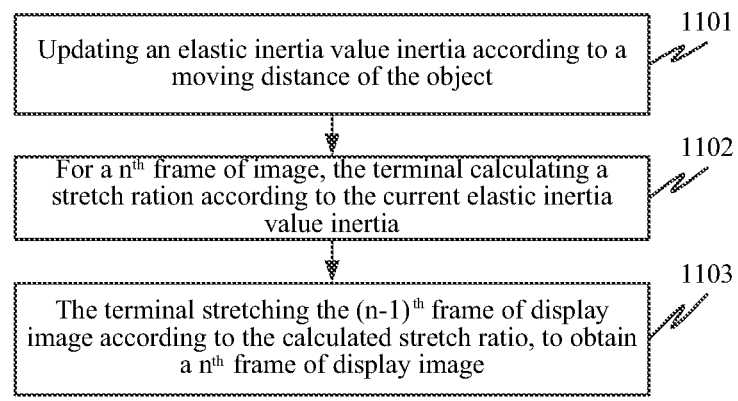
FIG. 11A is a flow chart of a method for displaying a document on a touch screen display according to another exemplary embodiment.
Figure 11B:
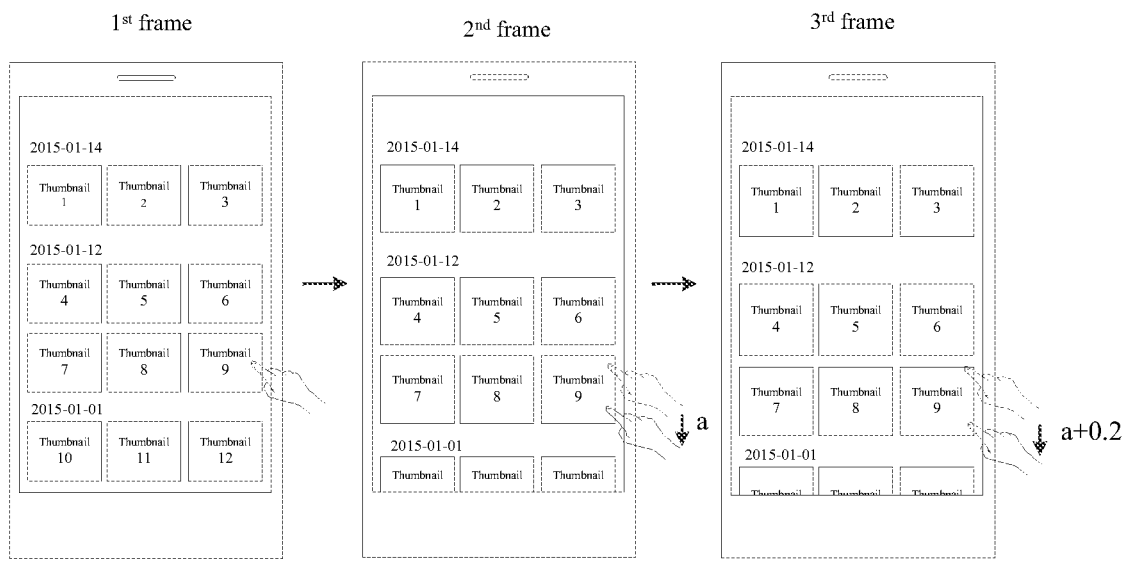
FIG. 11B is a schematic interface of the exemplary embodiment shown in FIG. 11A in implementation.

As an example, referring to FIG. 11B, in the $1^{st}$ frame of display image, the 12 thumbnails are not stretched, and the moving for display has reached the edge region of the electronic at this time. It is assumed that a finger moves for a distance of a cm on the touch screen display 23, and at this time the elastic inertia value inertia is A1. Then, the terminal calculates the stretch ratio of the $2^{nd}$ frame of display image being longitudinally stretching to 104% according to the elastic inertia value inertia of A1. The terminal stretches the entire container where the twelve thumbnails are accommodated longitudinally to 104%, to obtain the $2^{nd}$ frame of display image. The stretch ratio of the $2^{nd}$ frame of display image in relative to the $1^{st}$ frame of display image increases at a rate of: (104%−100%)/t=4%/t, where t is a difference of display time between two adjacent frames.

Afterwards, for the $3^{rd}$ frame of display image, it is assumed that the finger moves for a distance of a+0.2 cm on the touch screen display 23. At this time, the elastic inertia value inertia is A2. Since A2>A1, the terminal calculates the stretch ratio of the $3^{rd}$ frame of display image being longitudinally stretching to 107% according to the elastic inertia value inertia of A2. The terminal stretches the entire container where the twelve thumbnails are accommodated longitudinally to 107%, to obtain the $3^{rd}$ frame of display image. It can be seen that, since the moving distance of the finger increases, the elastic inertia value increases, the stretch ratio of the $3^{rd}$ frame of display image in relative to the $2^{nd}$ frame of display image increases at a rate of: (107%−104%)/t=3%/t, therefore, the increasing rate of the stretch ratio decreases.

However, for the same frame of display image, the stretch ratio of each of the thumbnails is the same.

In addition, the embodiments of the present disclosure provide the following embodiment.

FIG. 12A is a flow chart of a method for displaying a document on a touch screen display according to another exemplary embodiment. In the present embodiment, the method for displaying a document is described as applied in a terminal having a touch screen display, for example. The method for displaying a document can include the following steps.

In step 1201, a first region of an electronic document is displayed on the touch screen display.

When it is to display an electronic document, a terminal can display a first region of the electronic document, the first region containing a part of the display elements of the electronic document.

In step 1202, a movement of an object acting on the touch screen display is detected.

When the object moves, the terminal detects the movement of the object through the touch screen display. For example, the movement can be a movement away from an edge in an edge region.

In step 1203, in response to the movement of the object, the first region of the electronic document is moved for display as a second region.

In response to the movement of the object, the terminal moves the electronic document for display. The moving rate of the moving can be the same as the moving rate of the object.

Figure 12B:
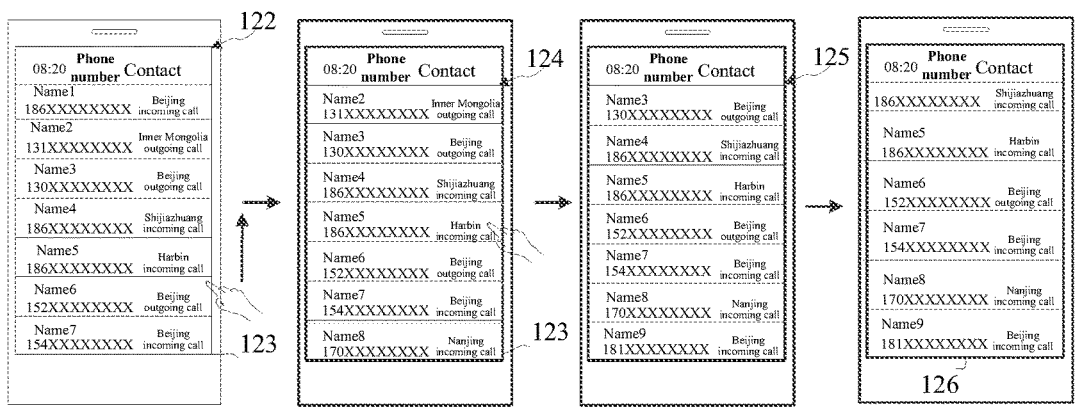
FIGS. 12B and 12C are schematic interfaces of the exemplary embodiment shown in FIG. 12A in implementation.

As an example, referring to FIG. 12B, it is assumed that the electronic document is an interface 122 of calling records. A first region of the interface 122 of calling records is displayed on the touch screen display 123. The first region contains the $1^{st}$ to 7th rows of calling records.

For example, the object is a finger of the user. When the finger moves upward on the touch screen display 123, the terminal detects the movement of the finger through the touch screen display 123. In response to the movement of the finger, the terminal moves the first region of the electronic document upward for display as a second region 124. The second region 124 contains the $2^{nd}$ to $8^{th}$ rows of calling records.

If this method is implemented in an Android operating system, during the moving for display, rather than stretch for display, the terminal can nevertheless set the elastic inertia value inertia as positively correlating to the moving rate of the object. For example, the elastic inertia value inertia can be set as, for two adjacent frames display images, an object position corresponding to a latter frame of display image minus an object position corresponding to a former frame of display image. The object position refers to an object position detected on the touch screen display.

In step 1204, when it is detected that the object is no longer on the touch screen display, the second region of the electronic document is kept to be moved for display.

During the moving for display, the moving rate can be related to the moving rate of the object.

When it is detected that the object is no longer on the touch screen display, the terminal keeps the second region of the electronic document to be moved for display at an ever decreasing moving rate. The moving rate can be gradually decreased to a preset threshold in a preset decreasing manner. The preset threshold can be 0, and the preset decreasing manner can be decreasing at a uniform deceleration rate.

During the process that the second region of the electronic document is kept to be moved for display at an ever decreasing moving rate, an "inertia" sliding effect can be presented to the user.

As an example, still referring to FIG. 12B, when it is detected that the finger is no longer on the touch screen display 123, the terminal can keep the second region 124 to be moved for display at an ever decreasing moving rate.

If this method is implemented in an Android operating system, when it detects that the object is no longer on the touch screen display, the terminal can also decrease the saved elastic inertia value at a preset decreasing rate.

In step 1205, if the moving for display reaches the edge region of the electronic document, the one or more display elements in the edge region are stretched for display in a direction away from the edge of the electronic document, the edge region containing the edge and the one or more display elements.

If the second region 124 is kept to be moved for display at an ever decreasing rate, the display has reached the edge region of the electronic document, and at this time the moving rate has not yet been decreased to 0, the terminal stretches for display the one or more display elements in the edge region in the direction away from the edge of the electronic document for the first preset time.

As an example, still referring to FIG. 12B, the terminal moves for display the second region 124 in the interface 122 of calling records at a decreased moving rate. When the moving for display reaches the edge region 125 of the interface 122 of calling records, and the moving rate has not yet be decreased to 0, the terminal stretches for display the $3^{rd}$ to $9^{th}$ rows of calling records in the edge region 125 in the direction away from the lower edge 126.

The process of stretch for display can be implemented through an easing interpolation algorithm. Then, the process of stretch for display can last for a first preset time period, such as 0.2 second. Before the stretch for display, the terminal can calculate the stretch ratio for the process of stretch for display according to the saved elastic inertia value through an input easing interpolation algorithm. The easing interpolation algorithm has various forms, which is not limited in the embodiments of the present disclosure.

In step 1206, the display elements that have been stretched for display are recovered to display states before the stretch.

After it stops the stretch for display, the terminal can recover the display elements that have been stretched for display to display states before the stretch in a second preset time period.

The process of the recover display can also be implemented through an easing interpolation algorithm. The process of the recover display can last for a preset time period, such as 0.4 second. The process of the recover display can be regarded as an inverse process of the above process of the stretch display.

Figure 12C:
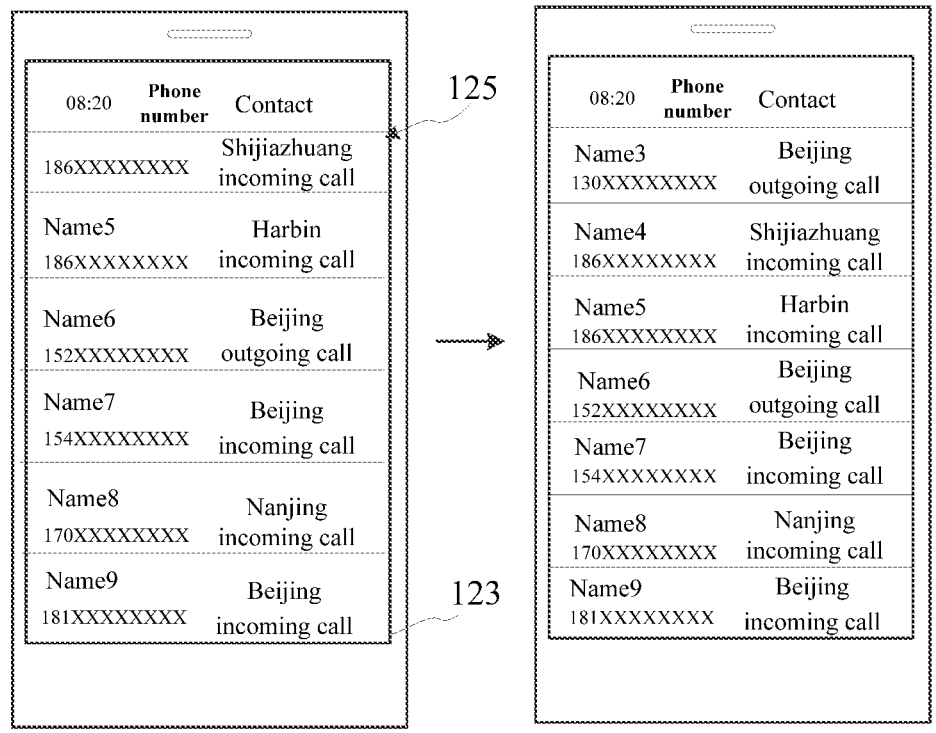

As an example, as shown in FIG. 12C, the terminal recovers the seven rows of calling records that have been stretched for display to the display states before the stretch.

Accordingly, in the method for display a document provided by the present embodiment, when the object is no longer detected, the terminal keeps moving for display and stretch for display, such that after the user's finger leaves the touch screen display, the user can clearly observe that the process of moving for display the electronic document has reached the edge region of the electronic document.

Based on the same principle, step 704 in the embodiment of FIG. 7A can also be implemented through an easing interpolation algorithm.

The following are device embodiments of the present disclosure, which can be configured to perform the method embodiments of the present disclosure. For details that are not disclosed in the device embodiments of the present disclosure, reference can be made to the method embodiments of the present disclosure.

Figure 13:
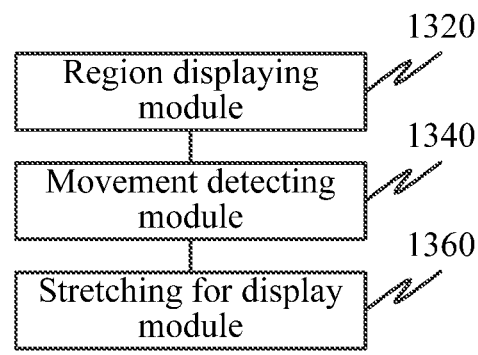
FIG. 13 is a block diagram of a device for displaying a document on a touch screen display according to an exemplary embodiment.

FIG. 13 is a block diagram of a device for displaying a document on a touch screen display according to an exemplary embodiment. The device for displaying a document can be implemented with software, hardware or a combination of the both into a part of or whole of an electronic device containing a touch screen display. The device for displaying a document can include: a region displaying module 1320 configured to display an edge region of an electronic document on the touch screen display, the edge region containing an edge of the electronic document and one or more display elements, a movement detecting module 1340 configured to detect a movement of an object acting on the touch screen display, and a stretching for display module 1360 configured to, in response to the movement of the object, stretch, for display, the one or more display elements in a direction away from the edge.

Accordingly, in the device for displaying a document provided by the present embodiment, when display reaches an edge region of an electronic document, one or more display elements are stretched for display in a direction away from the edge of the electronic document, as a response to a move operation of the user. Thereby, it reminds the user that the display has reached the edge of the electronic document, prevents the user from repeating move operation which is practically inapplicable, and thus improves efficiency of user operation.

Figure 14:
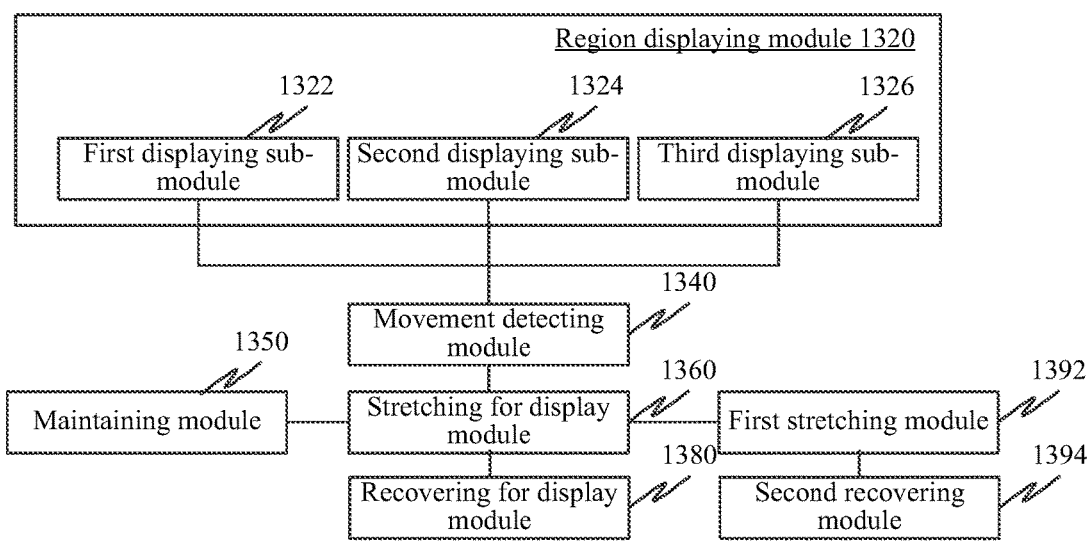
FIG. 14 is a block diagram of a device for displaying a document on a touch screen display according to another exemplary embodiment.

FIG. 14 is a block diagram of a device for displaying a document on a touch screen display according to an exemplary embodiment. The device for displaying a document can be implemented with software, hardware or a combination of the both into a part of or whole of an electronic device containing a touch screen display. The device for displaying a document can include: a region displaying module 1320 configured to display an edge region of an electronic document on the touch screen display, the edge region containing an edge of the electronic document and one or more display elements, a movement detecting module 1340 configured to detect a movement of an object acting on the touch screen display, and a stretching for display module 1360 configured to, in response to the movement of the object, stretch, for display, the one or more display elements in a direction away from the edge.

In a first possible implementation, the stretching for display module 1360 is configured to stretch, for display, all of the display elements in the edge region in the direction away from the edge.

In a second possible implementation, the stretching for display module 1360 is configured to maintain display states of n rows of display elements which are closest to the edge unchanged, where n is a positive integer, and stretch, for display, remaining rows of display elements apart from the n rows of display elements which are closest to the edge, in the direction away from the edge.

In the first and the second possible implementations, a stretch ratio for each of the display elements is the same, or, the stretch ratio for each of the display elements positively correlates to a first distance which is a distance between the display element and the edge.

In a third possible implementation, the stretching for display module 1360 is configured to stretch, for display, the display elements located between the edge and a position of the object, in the direction away from the edge. The position of the object is the corresponding position where the object acts on the touch screen display.

In a fourth possible implementation, the stretching for display module 1360 is configured to, among display elements located between the edge and a position of the object, stretch, for display, remaining rows of display elements apart from n rows of display elements which are closest to the edge, in a direction away from the edge, n being a positive integer. The position of the object is the corresponding position where the object acts on the touch screen display.

In the third and the fourth possible implementations, a stretch ratio for each of the display elements is the same, or, the stretch ratio for each of the display elements positively correlates to a first distance which is a distance between the display element and the edge. Alternatively, the stretch ratio for each of the display elements positively correlates to a second distance which is a distance between the display elements and the position of the object projected on a straight line perpendicular to the edge.

Optionally, the device further includes a maintaining module 1350 configured to maintain display states of the edge of the electronic document unchanged. Optionally, the device further includes a recovering for display module 1380 configured to, when it is detected that the object is no longer on the touch screen display, recover the display elements that have been stretched for display to display states before the stretch.

Alternatively, the recovering for display module 1380 is configured to, when it is detected that the object is no longer on the touch screen display, elastically scale for display the display elements that have been stretched for display for at least one time, and then recover the display elements that have been stretched for display to display states before the stretch.

Optionally, the device further includes a first stretching module 1392 configured to, when it is detected that the object is no longer on the touch screen display, keep stretching, for display, the one or more display elements for a first preset time period, and a second recovering module 1394 configured to recover the display elements that have been stretched for display to display states before the stretch in a second preset time period.

Optionally, the region displaying module 1320 includes a first displaying sub-module 1322 configured to, in response to a first signal for opening the electronic document, display the edge region of the electronic document on the touch screen display, or second displaying sub-module 1324 configured to, in response to a second signal for switching to the electronic document, display the edge region of the electronic document on the touch screen display, or a third displaying sub-module 1326 configured to display a partial region of the electronic document on the touch screen display, detect a movement of an object acting on the touch screen display, and in response to the movement of the object, move for display the partial region of the electronic document as the edge region of the electronic document.

Accordingly, in the device for displaying a document provided by the present embodiment, when display reaches an edge region of an electronic document, one or more display elements are stretched for display in a direction away from the edge of the electronic document, as a response to a move operation of the user. Thereby, it reminds the user that the display has reached the edge of the electronic document, prevents the user from repeating move operation which is practically inapplicable, and thus improves efficiency of user operation.

Further, in the device for displaying a document provided by the present embodiment, the display elements that have been stretched for display are recovered to display states before the stretch. Thereby, after the user is reminded that the display has reached the edge of the electronic document, the display state can be recovered to the state before the stretch, to facilitate other operations of the user.

Figure 15:
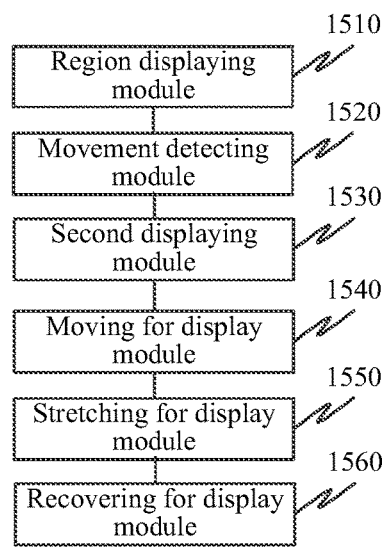
FIG. 15 is a block diagram of a device for displaying a document on a touch screen display according to another exemplary embodiment.

FIG. 15 is a block diagram of a device for displaying a document on a touch screen display according to an exemplary embodiment. The device for displaying a document can be implemented with software, hardware or a combination of the both into a part of or whole of an electronic device containing a touch screen display. The device for displaying a document can include a region displaying module 1510 configured to display a first region of an electronic document on the touch screen display, a movement detecting module 1520 configured to detect a movement of an object acting on the touch screen display, a second displaying module 1530 configured to, in response to the movement of the object, move for display the first region of the electronic document as a second region, a moving for display module 1540 configured to, when it is detected that the object is no longer on the touch screen display, keep moving for display the second region of the electronic document, a stretching for display module 1550 configured to, when the moving for display reaches an edge region of the electronic document, stretch, for display, one or more display elements in the edge region in a direction away from an edge of the electronic document, the edge region containing the edge and the one or more display elements, and a recovering for display module 1560 configured to recover the display elements that have been stretched for display to display states before the stretch.

Accordingly, in the device for display a document provided by the present embodiment, when the object is no longer detected, by keeping moving for display and stretching for display, after the user's finger leaves the touch screen display, the user can clearly observe that the process of moving for display the electronic document has reached the edge region of the electronic document.

With respect to the devices in the above embodiments, the specific manners for performing operations for individual modules therein have been described in detail in the embodiments regarding the methods, which will not be elaborated herein.

Figure 16:
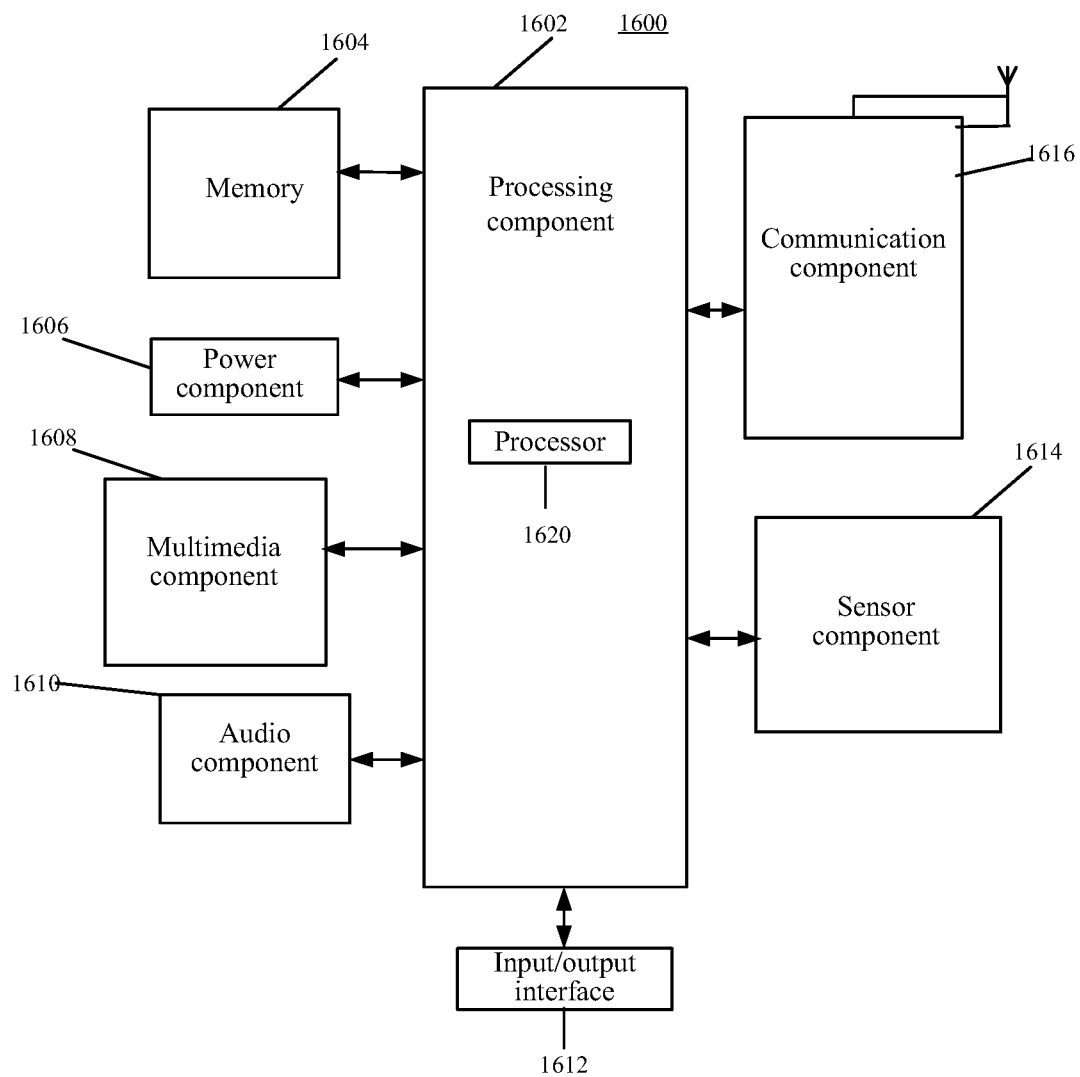
FIG. 16 is a block diagram of a device for displaying a document on a touch screen display according to another exemplary embodiment.

FIG. 16 is a block diagram of a device 1600 for displaying a document on a touch screen display according to an exemplary embodiment. For example, the device 1600 may be a mobile phone, a computer, a digital broadcast terminal, a messaging device, a gaming console, a tablet, a medical device, exercise equipment, a personal digital assistant, and the like.

Referring to FIG. 16, the device 1600 may include one or more of the following components: a processing component 1602, a memory 1604, a power component 1606, a multimedia component 1608, an audio component 1610, an input/output (I/O) interface 1612, a sensor component 1614, and a communication component 1616.

The processing component 1602 typically controls overall operations of the device 1600, such as the operations associated with display, telephone calls, data communications, camera operations, and recording operations. The processing component 1602 may include one or more processors 1620 to execute instructions to perform all or part of the steps in the above described methods. Moreover, the processing component 1602 may include one or more modules which facilitate the interaction between the processing component 1602 and other components. For instance, the processing component 1602 may include a multimedia module to facilitate the interaction between the multimedia component 1608 and the processing component 1602.

The memory 1604 is configured to store various types of data to support the operation of the device 1600. Examples of such data include instructions for any applications or methods operated on the device 1600, contact data, phonebook data, messages, pictures, video, etc. The memory 1604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1606 provides power to various components of the device 1600. The power component 1606 may include a power management system, one or more power sources, and any other components associated with the generation, management, and distribution of power in the device 1600.

The multimedia component 1608 includes a touch screen display providing an output interface between the device 1600 and the user. In some embodiments, the touch screen display may include a liquid crystal display (LCD) and a touch panel (TP). The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1608 includes a front camera and/or a rear camera. The front camera and the rear camera may receive an external multimedia datum while the device 1600 is in an operation mode, such as a photographing mode or a video mode. Each of the front camera and the rear camera may be a fixed optical lens system or have focus and optical zoom capability.

The audio component 1610 is configured to output and/or input audio signals. For example, the audio component 1610 includes a microphone ("MIC") configured to receive an external audio signal when the device 1600 is in an operation mode, such as a call mode, a recording mode, and a voice recognition mode. The received audio signal may be further stored in the memory 1604 or transmitted via the communication component 1616. In some embodiments, the audio component 1610 further includes a speaker to output audio signals.

The I/O interface 1612 provides an interface between the processing component 1602 and peripheral interface modules, such as a keyboard, a click wheel, buttons, and the like. The buttons may include, but are not limited to, a home button, a volume button, a starting button, and a locking button.

The sensor component 1614 includes one or more sensors to provide status assessments of various aspects of the device 1600. For instance, the sensor component 1614 may detect an open/closed status of the device 1600, relative positioning of components, e.g., the display and the keypad, of the device 1600, a change in position of the device 1600 or a component of the device 1600, a presence or absence of user contact with the device 1600, an orientation or an acceleration/deceleration of the device 1600, and a change in temperature of the device 1600. The sensor component 1614 may include a proximity sensor configured to detect the presence of nearby objects without any physical contact. The sensor component 1614 may also include a light sensor, such as a CMOS or CCD image sensor, for use in imaging applications. In some embodiments, the sensor component 1614 may also include an accelerometer sensor, a gyroscope sensor, a magnetic sensor, a pressure sensor, or a temperature sensor.

The communication component 1616 is configured to facilitate communication, wired or wirelessly, between the device 1600 and other devices. The device 1600 can access a wireless network based on a communication standard, such as WiFi, 2G, or 3G, or a combination thereof. In one exemplary embodiment, the communication component 1616 receives a broadcast signal or broadcast associated information from an external broadcast management system via a broadcast channel. In one exemplary embodiment, the communication component 1616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods for displaying a document.

In exemplary embodiments, there is also provided a non-transitory computer-readable storage medium including instructions, such as included in the memory 1604, executable by the processor 1620 in the device 1600, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium are executed by a processor of the device 1600, the device 1600 is enabled to perform the methods for displaying a document.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for displaying a document on a touch screen display of a terminal, comprising:

displaying, by the terminal, an edge region of an electronic document on the touch screen display, the edge region containing an edge of the electronic document and one or more display elements each corresponding to a sub-region of an electronic document, wherein one or more display elements comprise a plurality rows of thumbnails and two adjacent rows of thumbnails are separated by an interval with a preset width;

detecting, by the terminal, a movement of an object acting on the touch screen display along a moving direction; and in response to detecting the movement of the object in the moving direction, stretching, for display, at least one row of thumbnails in the moving direction away from the edge while maintaining the interval with the preset width unchanged between stretched rows of thumbnails and maintaining display states of remaining consecutive rows of thumbnails including a row of display elements which are closest to the edge unchanged, the one or more display elements not being stretched in a direction perpendicular to the direction away from the edge, wherein a stretch ratio for each of the thumbnails positively correlates to a distance between a stretched thumbnail and the edge, the larger the distance between the stretched thumbnail and the edge is, the larger a stretch ratio for the stretched thumbnail is, and wherein two different rows of thumbnails have two different stretch ratios based on the difference distances.

2. The method according to claim 1, wherein stretching, for display, the one or more display elements in a direction away from the edge comprises:

stretching, for display, all of the display elements in the edge region in the direction away from the edge.

3. The method according to claim 1, wherein stretching, for display, at least one of the one or more display elements in a direction away from the edge comprises:

stretching, for display, the display elements located between the edge and a position of the object, in the direction away from the edge, wherein the position of the object is a corresponding position where the object acts on the touch screen display.

4. The method according to claim 3, wherein
the stretch ratio for each of the display elements positively correlates to a first distance, the first distance being a distance between each of the display elements and the edge, or
the stretch ratio for each of the display elements positively correlates to a second distance, the second distance being a distance between each of the display elements and the position of the object projected on a straight line perpendicular to the edge.

5. The method according to claim 1, wherein stretching, for display, at least one of the one or more display elements in a direction away from the edge comprises:
among the display elements located between the edge and a position of the object, stretching, for display, remaining rows of display elements apart from n rows of display elements including a row of display elements which are closest to the edge, in a direction away from the edge, n being a positive integer;
wherein the position of the object is a corresponding position where the object acts on the touch screen display.

6. The method according to claim 1, wherein the method further comprises:
maintaining display states of the edge of the electronic document unchanged.

7. The method according to claim 1, wherein the method further comprises:
when it is determined that the object is no longer on the touch screen display, recovering the display elements that have been stretched for display to display states before the stretch.

8. The method according to claim 7, wherein when it is determined that the object is no longer on the touch screen display, recovering the display elements that have been stretched for display to display states before the stretch, comprises:
when it is detected that the object is no longer on the touch screen display, elastically scaling for display the display elements that have been stretched for display for at least one time, and then recovering the display elements that have been stretched for display to display states before the stretch.

9. The method according to claim 7, further comprising:
maintaining display margin of the edge of the electronic document unchanged in both the stretching of the display elements and the recovering of the display elements.

10. The method according to claim 1, wherein the method further comprises:
when it is determined that the object is no longer on the touch screen display, maintaining the stretched display of the one or more display elements for a first preset time period; and
recovering the display elements that have been stretched for display to display states before the stretch in a second preset time period.

11. The method according to claim 1, wherein displaying an edge region of an electronic document on the touch screen display comprises:
in response to a first signal for opening the electronic document, displaying the edge region of the electronic document on the touch screen display; or
in response to a second signal for switching to the electronic document, displaying the edge region of the electronic document on the touch screen display; or
displaying a partial region of the electronic document on the touch screen display, detecting a movement of an object acting on the touch screen display; and in response to the movement, moving the partial region of the electronic document to display the edge region of the electronic document on the touch screen display.

12. A method for displaying a document on a touch screen display, comprising:
displaying a first region of an electronic document on the touch screen display, wherein the first region comprises one or more display elements comprising a plurality rows of thumbnails and two adjacent rows of thumbnails are separated by an interval with a preset width;
detecting a movement of an object acting on the touch screen display along a moving direction;
in response to the movement of the object in the moving direction, moving for display the first region of the electronic document as a second region;
when it is detected that the object is no longer on the touch screen display, keeping moving for display the second region of the electronic document;
when detecting the moving for display in the moving direction reaches an edge region of the electronic document, stretching, for display, at least one of one or more display elements in the edge region in a direction away from an edge of the electronic document while maintaining the interval with the preset width unchanged between stretched rows of thumbnails and maintaining display states of remaining consecutive rows of thumbnails including a row of display elements which are closest to the edge unchanged, the one or more display elements not being stretched in a direction perpendicular the direction away from the edge, and the edge region containing the edge and the one or more display elements; and
recovering the display elements that have been stretched for display to display states before the stretch,
wherein a stretch ratio for each of the thumbnails positively correlates to a distance between a stretched thumbnail and the edge, the larger the distance between the stretched thumbnail and the edge is, the larger a stretch ratio for the stretched thumbnail is, and wherein two different rows of thumbnails have two different stretch ratios based on the difference distances.

13. A device for displaying a document on a touch screen display, comprising:
a processor;
a memory for storing instructions executable by the processor; and
a touch screen display electrically connected to the processor,
wherein the processor is configured to perform:
displaying an edge region of an electronic document on the touch screen display, the edge region containing an edge of the electronic document and one or more display elements, each corresponding to a sub-region of an electronic document, wherein one or more display elements comprise a plurality rows of thumbnails and two adjacent rows of thumbnails are separated by an interval with a preset width;
detecting a movement of an object acting on the touch screen display along a moving direction; and
in response to detecting the movement of the object in the moving direction, stretching, for display, at least one row of thumbnails in the moving direction away from the edge while maintaining the interval with the preset width unchanged between stretched rows of thumbnails and maintaining display states of remaining consecutive rows of thumbnails including a row of display elements which are closest to the edge unchanged, the one or more display elements not being stretched in a direction perpendicular the direction away from the edge, wherein a stretch ratio for each of the thumbnails positively correlates to a distance between a stretched thumbnail and the edge, the larger the distance between the stretched thumbnail and the edge is, the larger a stretch ratio for the stretched thumbnail is, and wherein two different rows of thumbnails have two different stretch ratios based on the difference distances.

14. The device according to claim 13, wherein stretching, for display, at least one of the one or more display elements in a direction away from the edge comprises:

stretching, for display, the display elements located between the edge and a position of the object, in the direction away from the edge;

wherein the position of the object is a corresponding position where the object acts on the touch screen display.

15. The device according to claim 13, wherein stretching, for display, at least one of the one or more display elements in a direction away from the edge comprises:

among the display elements located between the edge and a position of the object, stretching, for display, remaining rows of display elements apart from n rows of display elements including a row of display elements which are closest to the edge, in a direction away from the edge, n being a positive integer;

wherein the position of the object is a corresponding position where the object acts on the touch screen display.

16. The device according to claim 13, wherein displaying an edge region of an electronic document on the touch screen display comprises:

in response to a first signal for opening the electronic document, displaying the edge region of the electronic document on the touch screen display; or in response to a second signal for switching to the electronic document, displaying the edge region of the electronic document on the touch screen display; or displaying a partial region of the electronic document on the touch screen display, detecting a movement of an object acting on the touch screen display; and in response to the movement, moving the partial region of the electronic document to display the edge region of the electronic document on the touch screen display.

17. A non-transitory computer-readable storage medium comprising instructions that, when executed by a processor in a device, causes the device to perform a method for displaying a document on a touch screen display, the method comprising:

displaying an edge region of an electronic document on the touch screen display, the edge region containing an edge of the electronic document and one or more display elements each corresponding to a sub-region of an electronic document, wherein one or more display elements comprise a plurality rows of thumbnails and two adjacent rows of thumbnails are separated by an interval with a preset width;

detecting a movement of an object acting on the touch screen display along a moving direction; and in response to detecting the movement of the object in the moving direction, stretching, for display, at least one row of thumbnails in the moving direction away from the edge while maintaining the interval with the preset width unchanged between stretched rows of thumbnails and maintaining display states of remaining consecutive rows of thumbnails including a row of display elements which are closest to the edge unchanged, the one or more display elements not being stretched in a direction perpendicular to the direction away from the edge, wherein a stretch ratio for each of the thumbnails positively correlates to a distance between a stretched thumbnail and the edge, the larger the distance between the stretched thumbnail and the edge is, the larger a stretch ratio for the stretched thumbnail is, and wherein two different rows of thumbnails have two different stretch ratios based on the difference distances.

* * * * *